(12) United States Patent
Firkan

(10) Patent No.: US 9,470,111 B2
(45) Date of Patent: Oct. 18, 2016

(54) AIR INDEPENDENT PROPULSION AND POWER GENERATION SYSTEM BASED ON EXOTHERMIC REACTION SOURCED THERMAL CYCLE

(71) Applicant: Serdar Firkan, East Hanover, NJ (US)

(72) Inventor: Serdar Firkan, East Hanover, NJ (US)

( * ) Notice: Subject to any disclaimer, the term of this patent is extended or adjusted under 35 U.S.C. 154(b) by 153 days.

(21) Appl. No.: 14/622,827

(22) Filed: Feb. 14, 2015

(65) Prior Publication Data

US 2015/0233266 A1   Aug. 20, 2015

Related U.S. Application Data

(60) Provisional application No. 61/940,361, filed on Feb. 14, 2014, provisional application No. 61/940,832, filed on Feb. 18, 2014.

(51) Int. Cl.
*F01K 15/04* (2006.01)
*F02C 1/05* (2006.01)
*F01K 7/16* (2006.01)

(52) U.S. Cl.
CPC ............ *F01K 15/04* (2013.01); *F01K 7/16* (2013.01); *F02C 1/05* (2013.01); *F05D 2210/12* (2013.01); *F05D 2220/32* (2013.01)

(58) Field of Classification Search
CPC ......... Y02E 60/50; F01K 15/04; F01K 7/16; F02C 1/05; F05D 2210/12; F05D 2220/32
See application file for complete search history.

(56) References Cited

U.S. PATENT DOCUMENTS

| 5,867,978 | A  | * | 2/1999  | Klanchar    | C01B 3/065  |
|           |    |   |         |             | 165/169     |
| 8,555,652 | B1 | * | 10/2013 | Touchton    | F02C 3/20   |
|           |    |   |         |             | 60/39.182   |
| 9,175,850 | B1 | * | 11/2015 | Touchton    | F23C 10/10  |
| 9,284,854 | B2 | * | 3/2016  | Guyomarc'h  | F01K 13/00  |
| 9,346,013 | B2 | * | 5/2016  | Moghtaderi  | C01B 13/08  |
| 9,371,227 | B2 | * | 6/2016  | Fan         | C01B 3/063  |
| 2013/0025192 | A1 | * | 1/2013 | Wegeng    | B01J 19/127 |
|           |    |   |         |             | 44/457      |

* cited by examiner

*Primary Examiner* — Michael Zarroli

(57) ABSTRACT

An air independent propulsion and power generation system based on thermal cycle generated from continuous exothermic reaction cycle in a controlled volume space. An exothermic reactor utility for generating power by producing steam or overheating another heat transfer fluid in gas state for supplying a power turbine system in order to produce electrical energy or mechanical power. A controlled exothermic reaction is occurred by injecting exothermic agents into the reaction chambers of the invention in a controlled sequence and computed timing which gives out heat and enables the transfer of the exothermic reaction output heat to the fluid of the thermal cycle. The exothermic reaction cycle does not need atmospheric connection or air or oxygen. The invention provides option to use multiple chemical types independently at the same time in any of its reaction chambers.

11 Claims, 34 Drawing Sheets

AIR INDEPENDENT PROPULSION AND POWER GENERATION SYSTEM BASED ON EXOTHERMIC REACTION SOURCED THERMAL CYCLE

REFERENCE TO PENDING PRIOR PATENT APPLICATIONS

This patent application:

(1) claims benefit of pending prior U.S. Provisional Patent Application Ser. No. 61/940,361, filed Feb. 14, 2014 by Serdar Firkan for EXOTHERMIC REACTOR WITH EXOTHERMIC REACTION CHAMBERS AND EXOTHERMIC INJECTORS FOR HEATING, ELECTRIC AND POWER GENERATION; and (2) claims benefit of pending prior U.S. Provisional Patent Application Ser. No. 61/940,832, filed Feb. 18, 2014 by Serdar Firkan for EXOTHERMIC REACTOR FUEL.

The two above-identified patent applications are hereby incorporated herein by reference.

FIELD OF THE INVENTION

This invention relates to an air independent power generation and propulsion system based on exothermic reactor for generating thermal cycle by producing steam or overheating another working fluid to be sent to a power turbine system, or to a Rankine Cycle (steam turbine) or to a Brayton Cycle (gas turbine) for producing electrical energy or mechanical shaft power. The invention relates to a controlled exothermic reaction by injecting exothermic agents into a reaction chamber in a controlled sequence and computed timing which gives out heat and enables the transfer of heat to the fluid inside the reactor body. The invention relates to produce power and electric combining alternative fuel options by using exothermically chemical reactants. The invention relates to produce necessary heat, electric, and power where in absence of oxygen, and air compared to hydrocarbon fuel using systems or alternative to solar, wind, water stream, or geothermal sources or alternative to nuclear reactor power more particularly comprising a new power configuration for submarines, ships, subsea vessels. The invention relates to mobilized power generation unit. The invention relates to submarines for reducing the detection risk of the submarines at snorkel depths and increasing the thrust power during evasive maneuvering.

BACKGROUND OF THE INVENTION

The object of this invention is to produce power by combining a chemical reactor and a steam or appropriate fluid in order to supply a compressor or power turbine system to generate power and electricity and propulsion independent from air. Another object of this invention is to provide a power generation system which may be constructed either stationary or mobilized, and commercially be available to all industrial and personal applications alternative to either hydrocarbon fuel systems or natural power sources like sun, wind, wave, etc. More specifically, the invention relates to an arrangement as disclosed in the preamble of independent claims 1, 2, 3, 9, and 11. The further object of this invention is to provide alternative power production more specifically on sea, at subsea or arctic regions with almost zero emissions and without air.

There a number of problems arising in exhaust emissions due to need to large container vessels, VLCCs, ultra large bulk cargo ships. As the ships are built in larger sizes the sizes of the diesel engines are increasing. Thus the emissions are increased as the engines are producing higher power. In order to decrease the emissions especially on sea transportation, the most ship designs sacrifices from speed. For lower speeds, the cargo charters or ship operators are looking for shorter routes in order to compensate the disadvantage of the ship designs on speed side. Shorter intercontinent routes are generally located on arctic conditions like North Sea, Bering Passage, and North Atlantic where sea conditions results possible delays or extra wave resistance which reduces the speed of the vessels and increases fuel consumption. On the other hand arctic routes need long distance vessel without being supplied for fuel for a very long time. Several attempts were made to use nuclear powered cargo and utility ships; but nuclear power cannot be commercialized due to security and safety reasons after many learned lessons in the history.

As the fossil fuel resources are getting decreased and dried day by day, alternative energy sources are in development. Due to decreasing availability of resources, more costly routes are in subject for exploration of oil such as deep sea drilling, Greenland ice drilling. For such said operations current fossil fuel engine powered transportation vessels are offering limited and interrupted operation performances due to weather, sea and environmental factors.

Alternative fuel and energy sources are not yet powerful enough for supply large conventional transport and cargo vessels.

Submarines are not capable to travel long distances underwater when not using nuclear power.

Subsea operating vessels such as deep sea drilling, arctic ice drilling are dependent on surface supply vessels or platforms nearby themselves.

Building plants nearby the resources are generally creating extra difficulties like bringing electricity, fuel type power requirements. Environmental regulations near the resources do not enable the plant operations based on fossil fuel or hydrocarbon fuels. So the plants are needed to be located further than the resources.

Fossil fuels or hydrocarbon fuels have exhaust products which none of them or very trace amount them can be reused which effects the efficiency of said type hydrocarbon fuels in a negative way.

Other problem of the fossil fuel or hydrocarbon fuel operated systems are in need of air or oxygen which especially create a detection risk for a submarine with a diesel engine when cruising at snorkel depth or surface speed even at night.

Another problem in a liquid fossil fuel dependent system is to keep the fuels warm or at pumpability temperature (also known as Clog Point or Pour Point) especially in arctic weather conditions.

In chemical plants or in refineries, the excessive heat coming from exothermic reactions is used for heating another production process or steam for power turbines. These systems are dependent and particular only for the systems they have designed.

Another problem is as in prior similar arts have generally single reaction chamber design which is located in or around another process or a heat exchanger. These systems are not being operated or treated in piston type engine system machine mentality.

Another problem in exothermic reactors is the complexity of the injection system of reactants and the removal or by other definition the discharge of reaction products from the chamber. The complexity increases when the injection and especially discharge sequence is put in a sequence like adiabatic engine piston systems.

Another problem in such exothermic reactors is the reactant state. General designs are based on mixture of fluid state reactants which limits the usage of powder or solid state reactants.

Another problem in such exothermic reactors is the flushing of the injectors and chambers has to be done manually or replacing them with new or cleaned ones by stopping the system fully or partially.

Another problem in such exothermic reactors and in other chemical reactors, the design of the injection systems are limiting mixing, dosing and injection actions of different types of chemicals in one system and in various sequences including the catalyzers.

Another problem in such exothermic reactors and in other chemical reactors is the limit on applying different type of chemical reactions in one vessel or heat exchanging system.

Another problem is such exothermic reactors and in other chemical reactors, they all are designed to use one set of chemical reaction process and particular to be used only for a certain part of another chemical process. Example of such exothermic reaction applications take place in petrochemical refineries, oil refineries and some chemicals production facilities.

To reduce or eliminate aforementioned disadvantages and problems, there is provided, according to the present invention, an arrangement as disclosed in the characterizing clause of claims 1, 2, and 9.

Advantageous embodiments of the invention are set forth in the dependent claims.

SUMMARY OF THE INVENTION

The invention comprises exothermic reactors which are consisting of reaction chambers, chemical reactant injectors, low pressure and high pressure vessels for heating a thermal cycle medium. More specifically the invention is based on a thermal cycle wherein the invention has a reaction chamber enabling to generate continuous exothermic reaction by enabling to use multiple chemical reactants in a controlled space volume.

The invention has a reaction chamber unit which a reactant injector connected to a reaction chamber. According to the required power or heat generation level, any numbers of said reaction chambers are connected to an exothermic reactor body which contains water, steam or gas. The said reaction chambers may be aligned inline, circular or any desired array variation according to the body geometry.

The invention has a reactant injector and a reaction chamber which solves the problems related to injection of reactants in a desirable sequencing depending on the reaction speed of used exothermic reactants.

The invention solves the problems related to use different chemical reactants in an exothermic reaction at different ratios or volumes or in different sequences. The invention has a reactant injector system with multiple injection port connections for adjusting the flow of injectors at any desired level separately. The said injection ports provide the injection, dosing, and mixing of different types of chemical reactants and any catalyzers at once or in a sequence with programmable pump controls.

The invention provides the application of many different types of chemical reactions inside one tank vessel or in one heat exchanger system by using different exothermic reaction process and chemicals including their catalyzers. The invention provides a wide range of combination option to use any kind of chemicals in one system according to the availability and environment being in.

The invention has a reactant injector with a discharge port which solves the problems related to discharging of unused part of the reactant which is left inside the injector. The number of said discharge port on the reactant injector system can be in multiple numbers and in multiple locations.

The invention solves the problems related to discharging different exothermic reaction products in a set sequence depending on the reaction of used exothermic reactants. The invention provides extension of a chemical reaction by adding the second stage of chemical elements or compounds onto the reaction products form the first stage inside the reaction chambers.

The invention has flushing and discharging ports on both reactant chambers, and reactant injectors that are providing flushing of the excessively pumped reactants from the injectors and discharging the chemical reaction products at any time and in a sequence even automatically or manually or semi-automatically.

The invention provides an advantage in injecting various kinds of reactants with any desired or programmed amount into the reaction chamber based on flow of mass or flow of volume and may be controlled manually or digitally.

The invention has no exhaust systems connected directly to the atmosphere. The invention provides solution to the emission reduction problems especially in marine type heavy duty engines.

The invention solves the limitation on application areas of exothermic reactors where the invention enables the use of exothermic reaction on ship propulsion, train propulsion, other type of vehicle productions.

The invention solves the limitations on the application of Stirling engines by providing additional heat production which is needed on its performance especially on aerospace and military systems. As one of the best mode of application, one of the reaction cores of the invention can be attached to a Stirling engine design in order to provide the high temperature source intake of the Stirling engine.

The invention is designed to be coupled with alternators in order to produce electricity and store electricity in any type of capacitors and battery systems. The invention is designed to be coupled with any other known power engines like CODAG system in frigates.

The invention provides satisfactory power outputs like adiabatic hydrocarbon fuel engines, thermal coal reactors or alternative environmental energy sources. The invention solves the need of power where converting alternative natural energy sources are problematic in arctic conditions, sub-sea operations, mobilized systems including offshore platforms.

The invention provides multipurpose application that enables to apply the invention on any kind of vehicle, including construction and mining machinery, industrial plant, house or location where power generator or air conditioning or heating is needed. The invention provides easy scaling in order to be used from domestic house to very large industrial plants including military and aerospace applications in a wide power range.

The invention solves providing of alternative power generation instead of diesel engines and nuclear reactors in sub-sea operations for sub-sea vessels, semi-submersibles, and submarines.

The invention solves the problem related to the cruise range of submarines based on electric motors and battery capacity under sub-sea operations by providing long range running option with necessary supplied amount of chemical reactant. The range may be extended by adapting recycling unit system as well as electrolysis and chemical processing which the system may consume some of the produced power to produce reactant from the exothermic reaction discharge products.

The invention solves the problems related to continuous power production at sub-sea operation due the absence of oxygen or air. The invention features water based exothermic reactions which the water is the main environmental intake substance like in adiabatic hydrocarbon fuel diesel, gasoline, and gas engines. This solution may be adapted to aerospace applications like outer space mining operations in other planets.

The invention solves the need for sub-sea operable utility vessels especially for off-shore platforms or exploration centers where an alternative energy source is asked to be used other than nuclear power or diesel engines.

The invention solves the detection risk of diesel-electric powered submarines cruising at snorkel depth by providing power generation independent form air or oxygen. The invention has less moving parts than a diesel engine which increase the efficiency of silent run when compared to the snorkel depth running.

The invention is designed to run itself in a continuous cycle including conversion of the exothermic reaction products back into reactants by using electrolysis and supporting chemical processes.

The invention has a closed cycle system which increase the efficiency of the used fuel (here chemical reactants are counted and defined as fuel) when generally compared with adiabatic hydrocarbon fuel engine systems like diesel engines.

The invention solves the application limitations on exothermic reactors which are mainly designed for a particular set of chemical reaction for only particular part of a chemical process in a plant. The invention provides to use multiple set of chemical reactions in one system and enable to mobilize or adapt the reactor to any process or facility like any other combustion engine.

The invention is designed to be used in mining excavation and crushing plants including their offshore platforms where power generation is needed.

Apart from the advantages mentioned above the invention will result in the following positive effects:

An improved operation options at deep see drilling.
Longer working periods in arctic regions.
Establishment of new commercial sea routes.
Reduced dependency to hydrocarbon fuels.
Reduced ozone and environmental damage.
Reworking of unused mining regions or mineral resources.
Reduced noise and vibrations because of less moving parts than adiabatic engines.
Increased hydrocarbon fuel efficiency and reduced operation costs where the system is combined with an adiabatic system by using low cost exothermic reactants like exothermically reactant with water.

The parts of invention are used independently, especially further described exothermic reactors 300, secondary exothermic reactors 400, reaction chamber 200 assemblies and/or the injector assemblies 100 of the invention in the drawing and claims, are adaptable to combustion engines, steam and gas turbines in order to increase efficiency and more particularly increases the steam enthalpy inside the steam turbine which is similar to afterburner system of the gas turbines.

Example of an Exothermic Reactant and Chemical Reaction in a Reaction Chamber

As a best mode of application of the invention but not limited to, the one example of the reaction process which may be used with this invention is based on the usage of sodium peroxide $Na_2O_2$ (solid) as a chemical agent which gives an exothermic reaction (1) with water. The reaction results with oxygen $O_2$ (gas) and sodium hydroxide NaOH (solid) products and excessive heat which is transferred to the fluid inside the exothermic reactor body. And as a second stage, an exothermic dilution process (2) is the spraying water on the sodium hydroxide NaOH (solid) which gives out heat which then transferred to the fluid outside the chamber.

The sodium peroxide $Na_2O_2$ (solid) is pumped to the chemical reactant injector of the invention. The reactant injector pulverizes $Na_2O_2$ (solid) into the reaction chamber of the invention. After then water is sprayed onto sodium peroxide $Na_2O_2$ (solid) in order to start exothermic reaction. As the reaction ends the gas product of the said reaction which is oxygen here is vacuumed from the outlet port of the reaction chamber. Meanwhile another portion of water is pulverized onto the remaining reaction product which is sodium hydroxide NaOH (solid). Solid sodium hydroxide NaOH ionizes in water to produce sodium Na (aqueous solution) and hydroxide OH (aqueous solution) ions. The reaction is a dilution process of sodium hydroxide NaOH (solid) (also known as caustic soda) with water and gives out heat. When all the above said reactions completed, the final product which is diluted sodium hydroxide NaOH (solid) is pumped to the suction line from the bottom outlet port of the reaction chamber of the invention.

The following examples describe the best mode of applications and there are numerous alternative chemical reaction combinations available for providing necessary power and energy outputs.

The said chemical reactions are briefly described herein:

$$2Na_2O_2(s) + 2H_2O(l) \Rightarrow 2O_2(g) + 4NaOH(s) \uparrow (\Delta H_1) \quad (1)$$

The formation enthalpies are (given at 298 K): $\Delta H_f(Na_2O_2) = -510.90$ kjmole$^{-1}$, $\Delta H_f(H_2O) = -285.80$ kjmole$^{-1}$, $\Delta H_f(NaOH) = -425.80$ kjmole$^{-1}$. According to Hess's Law, above described reaction equation gives a standard enthalpy of reaction $\Delta H_1 = -109.8$ kJ. This energy is coming from the reaction of two moles of $Na_2O_2$ (solid). In practical, for one mole of $Na_2O_2$ unit energy output is:

$$(-109.8 \text{ kJ}/2) = 54.9 \text{ kJ}.$$

$H_2O$ with NaOH(s), at the point in time when 1 mole of NaOH(s) pure substance dissolves in water gives a standard enthalpy of dissolution of −44.5 kJ.

$$NaOH(s) \Longrightarrow Na^+(aq) + OH^-(aq) \uparrow (\Delta H_2) \quad (2)$$

The second exothermic dilution process may be used optional depending on the heating regime of the fluid inside the exothermic rector body. For better understanding the second reaction (2) can be though as an afterburner process of aerospace gas turbines or a second stage heating of the gas furnaces.

In determining compounds that would satisfy the above-mentioned conditions 1, and 2, the main requirement to be met is that the enthalpy of dissolution into water or the enthalpy of reaction should be negative (exothermic).

The output energy is directly related to the injected exothermically reactant chemicals into the reaction chamber. For example when 225 cm³ of $Na_2O_2$ (solid) is injected into the chamber and then water is sprayed onto, the chemical reaction output energy is calculated as below just in one chamber:

225 cm³×2.805 gr/cm³ (density of Na$_2$O$_2$ (solid))=631.125 gr 631.125 gr/77.98 gr/mole (molar mass of Na$_2$O$_2$ (solid))=8.093 moles of Na$_2$O$_2$ (solid)

8.093 moles×54.9 kJ/mole Na$_2$O$_2$ (solid)=444.306 kJ

If there are 20 reaction chambers in a vessel and works at the same time than total energy per injection is calculated as:

444.306 kJ/chamber×20 chambers=8886.12 kJ

This is the energy only coming from the exothermic reaction between Na$_2$O$_2$ (solid) and H$_2$O(l). When water is continued to be sprayed onto the reaction product which is NaOH(solid), then additional energy output for four moles of NaOH in one reaction chamber is:

44.5 kJ×4=178 kJ/chamber

If there are 20 reaction chambers in a vessel then the total additional energy output is:

178 kJ/chamber×20 chambers=3560.0 kJ

As a result, for one injection period and following two exothermic reactions during the period, total energy output in a 20 reaction chamber reactor vessel is calculated as:

8886.12 kJ+3560.0 kJ=12446.12 kJ

Unit specific heat of water is assumed as $c_p$=4.2 kJ/kg° C. at 101.33 kPa. In this case total temperature increase for 1000 kg of water in a vessel is calculated with the formula $Q=m \cdot c_p \cdot \Delta t$ (where m(kg), $c_p$=4.2 kJ/kg° C., $\Delta t$(° C.)):

$\Delta t = Q/(m \cdot c_p)$=12446.12/(1000×4.2)=2.963° C.

Above mentioned examples and calculations are for principal calculations, and in practical the temperature increase rate and heat transfer rate are needed to be recalculated by considering the thermal conductivity of the reaction chamber wall material, isolation of the vessel (heat escape rate to outer wall), injection period of the chemicals and exothermic reaction speed(s) and temperature difference in time between reaction chamber and the medium (or working fluid) inside the vessel.

The invention comprises number of chemical supply and discharge lines, inlet ports and outlet ports on the injector assembly and reaction chambers which enables the use of any other chemicals and plus the booster chemicals (i.e. zinc Zn powder is mixed with sodium peroxide Na$_2$O$_2$) by adjusting the injection sequences and mixture proportions. For example, some of the supply lines of the ports are connected to different types of exothermically reactant chemical supply tanks which may contain single or multiple chemicals that are exothermically, explosively or violently reactive to water as listed below but not limited to:

Acetic Anhyride (C$_4$H$_6$O$_3$), Acetyl Chloride (CH$_3$COCl), Aluminum Bromide (AlBr$_3$), Aluminum Chloride (AlCl$_3$), Boron Tribomide (Bbr$_3$), Butyl Lithium (C$_4$H$_9$Li), Calcium Carbide (Ca$_3$C$_2$), Calcium Hydride (CaH$_2$), Chlorosulfonic Acid (ClSo$_3$H), Chlorotrimethyl Silane ((CH$_3$)$_3$SiCl), Dichlorodimethyl Silane ((CH$_3$)$_2$SiCl$_2$), Lithium Aluminum Hydride (LiAlH), Lithium Hydride (LiH), Lithium Metal (Li), Methyltrichlosilane (CH$_3$SiCl$_3$), Oxalyl Chloride (C$_2$Cl$_2$O$_2$), Phosphorus Pentachloride (PCl$_5$), Phosphorus Pentoxide (P$_2$O$_5$), Phosphorus Tribromide (PBr$_3$), Phosphorus Trichloride (PCl$_3$), Phosphoryl Chloride (POCl$_3$), Potasssium Amide (KNH$_2$), Potassium Hydride (KH), Potassium Metal (K), Potassium Hydroxide (KOH), Silicon Tetrachloride (SiCl$_4$), Sodium Amide (NaNH$_2$), Sodium Azide (NaNH$_3$), Sodium Hydride (NaH), Sodium Hydrosulfite (Na$_2$S$_2$O$_4$), Sodium Metal (Na), Strontium Metal (Sr), Sulfuric Acid (H$_2$SO$_4$), Tetrachloro Silane (SiCl$_4$), Thinonyl Chloride (SOCl$_2$), Titanium Tetrachloride (TiCl$_4$), Trichloro Silane (SiHCl$_3$), Triethyl Aluminum (Al(C$_2$H$_5$)$_3$), Triisobutly Aluminum (Al(C$_4$H$_9$)$_3$), Zirconium Tetrachloride (ZrCl$_4$). Low toxic or non-toxic chemicals are preferred in order to avoid environmental and health hazards.

Alternatively any exothermic chemical reactant combination is selected as a fuel for the reactor system which the invention is capable to inject and discharge all states of matter including gas, liquid, solid, semi-liquid or any mixture thereof.

Especially chemicals reacts exothermically water is chosen because the water is widely available when the invention is used at sea and at arctic conditions. With this approach invention reduces the number of kinds of chemicals to be used and decreases the dependency on the chemicals and decreases the energy costs.

Alternatively any two or multiple types of chemical reaction sets is applied inside the invention such as one reaction set is giving out oxygen gas and other reaction set is giving out hydrogen gas, which these two gases is used to supply polymer fuel cells or is reacted to provide water and take out excessive heat out for energy production in a later stage.

The invention is explained in greater detail on the basis of drawings which show further details also important to the invention.

BRIEF DESCRIPTION OF DRAWINGS

The foregoing aspects and many of the attendant advantages of this invention will become more readily appreciated as the same becomes better understood by reference to the following detailed description, when taken in conjunction with the accompanying drawings, and in the following, a non-limiting embodiment of the arrangement according to the invention is described in more detail with the reference to the accompanying drawings wherein.

DETAILED DESCRIPTION OF THE INVENTION

The process flow diagram of the invention herein describes the method and facility layout for air independent power generation and propulsion system using exothermically reactant chemical for producing thermal work includes only main process elements where gauges, PCUs (process control units), extra pumps, auxiliary pumps, auxiliary equipment, filtration systems, probes, and other standard and well known industrial equipment are not shown but still under the scope of the invention when put into installation and not ignorable as components of the invention.

Figure 1:
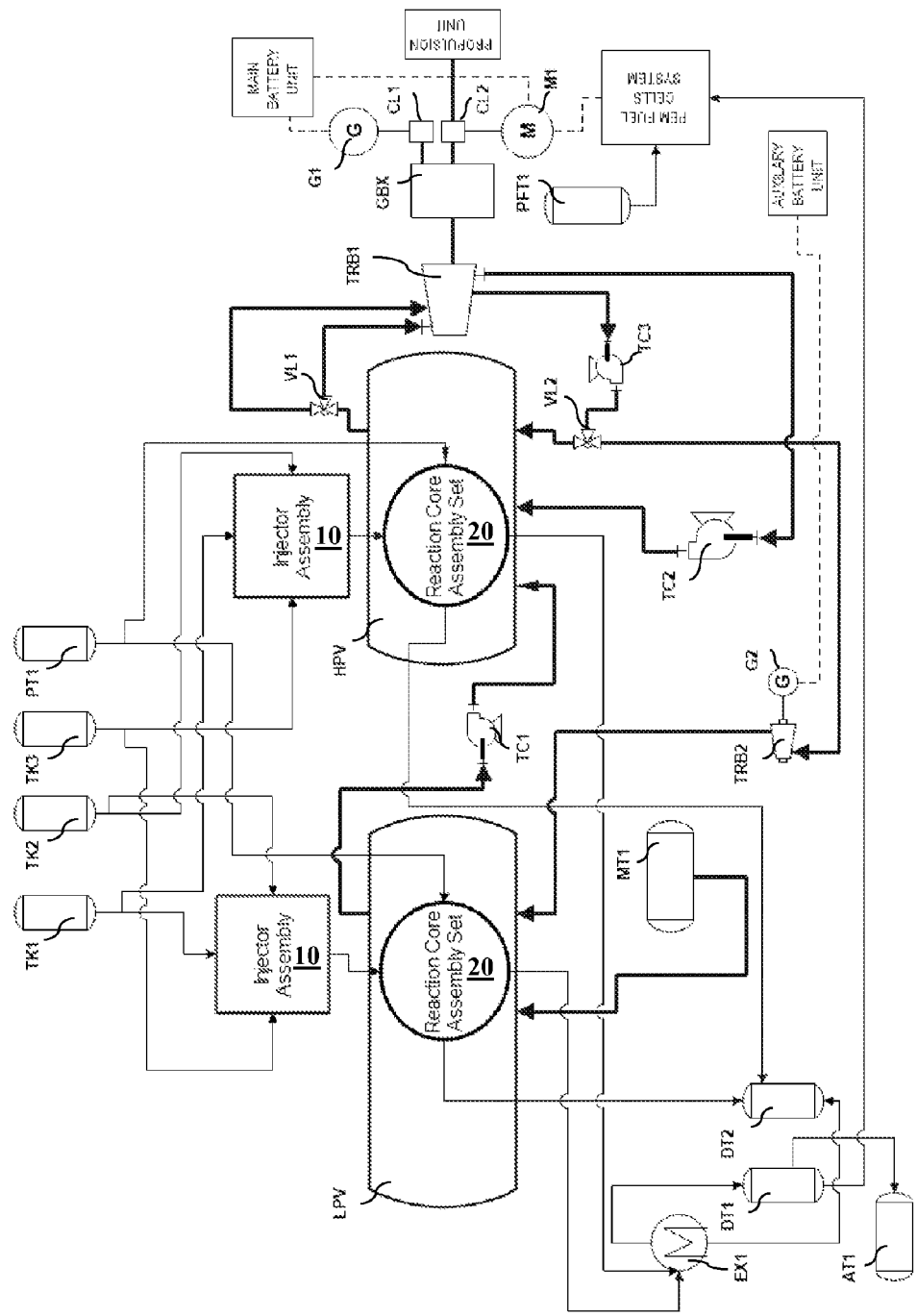
FIG. 1 is the schematic view of the invention showing chemical reaction flow and process, thermal cycle, power generation and propulsion system connections.
Figure 8:
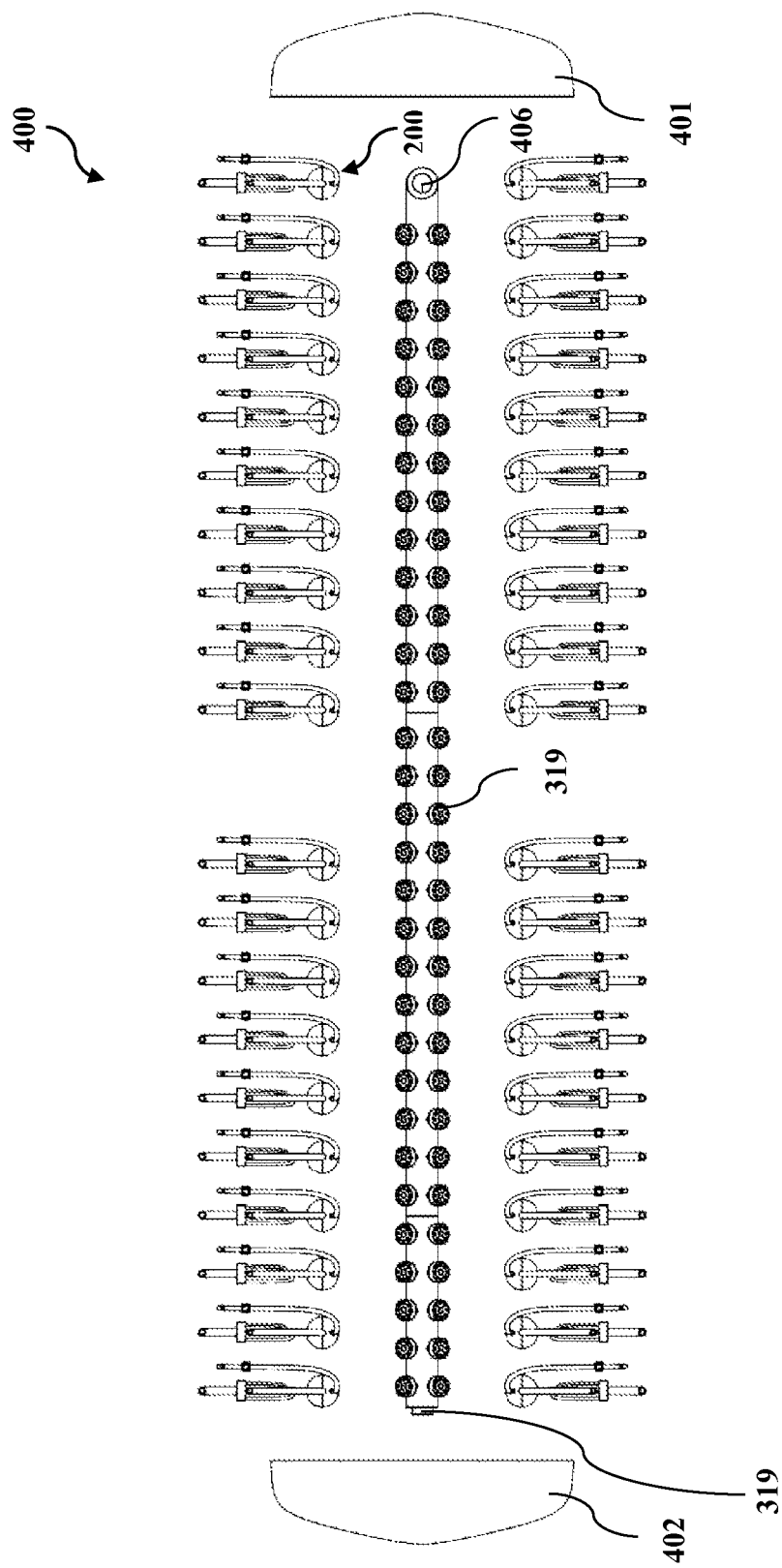
FIG. 8 is a perspective view of secondary exothermic reactor with extended number of reaction cores principally showing reaction core layout form top together with reactor cylinder body fore and aft heads, and steam return line. The cylinder part of the reactor body is extracted from the view for better understanding.
Figure 9:
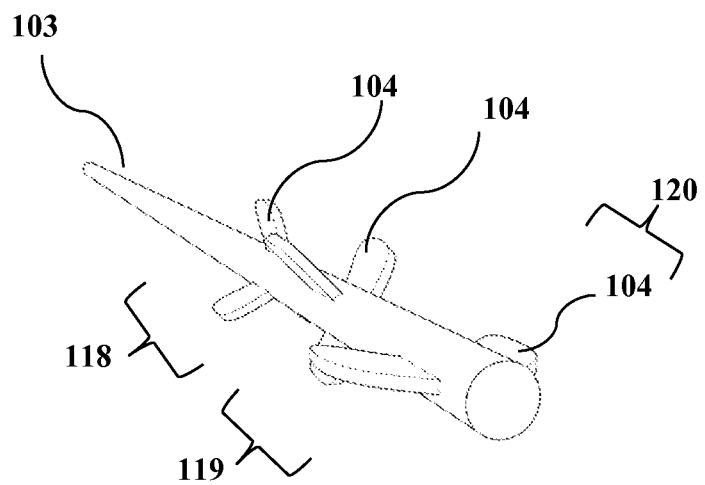
FIG. 9 is a perspective view of blade shaft.
Figure 10:
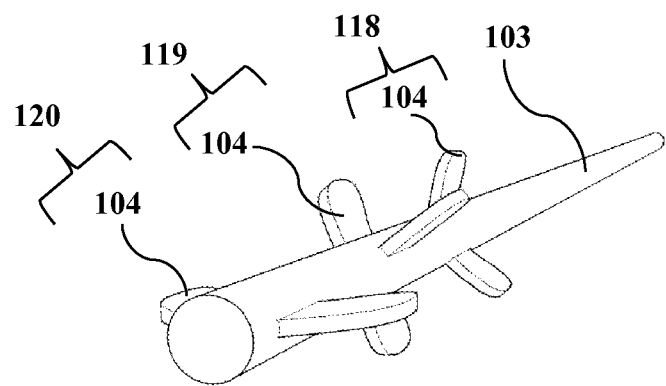
FIG. 10 is another perspective view of blade shaft.
Figure 11:
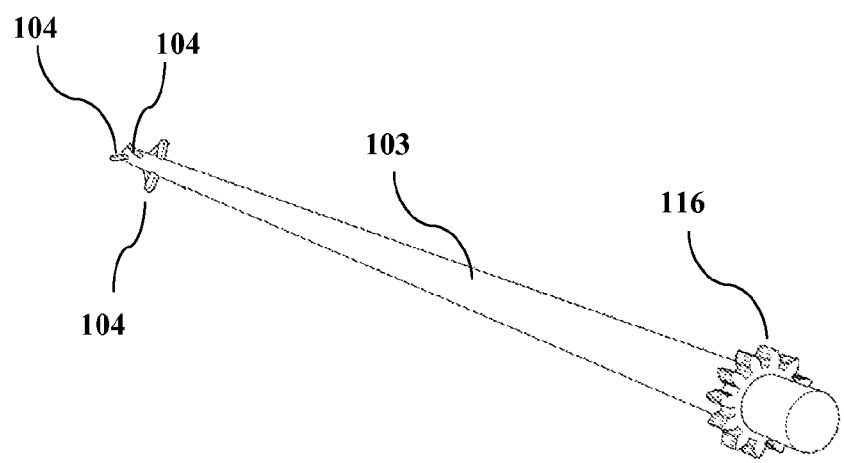
FIG. 11 is another perspective view of blade shaft.
Figure 12:
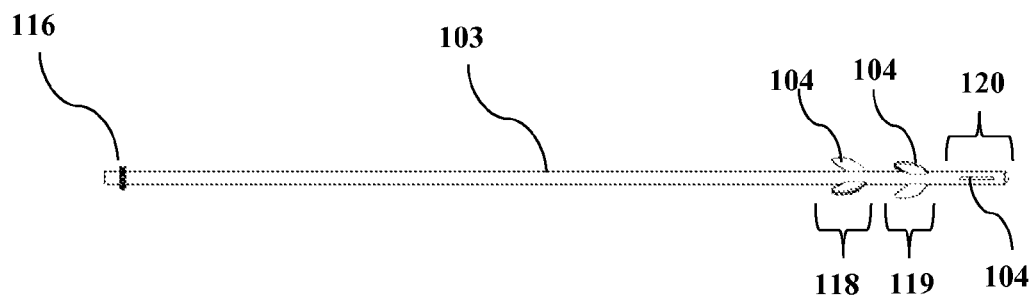
FIG. 12 is another perspective view of blade shaft.
Figure 13:
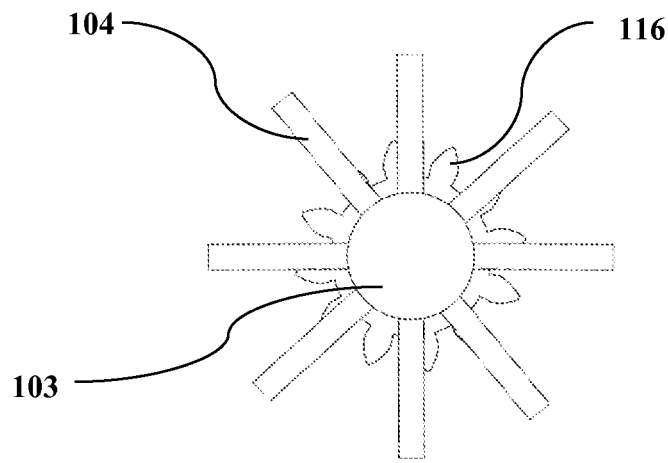
FIG. 13 is front view of blade shaft.
Figure 14:
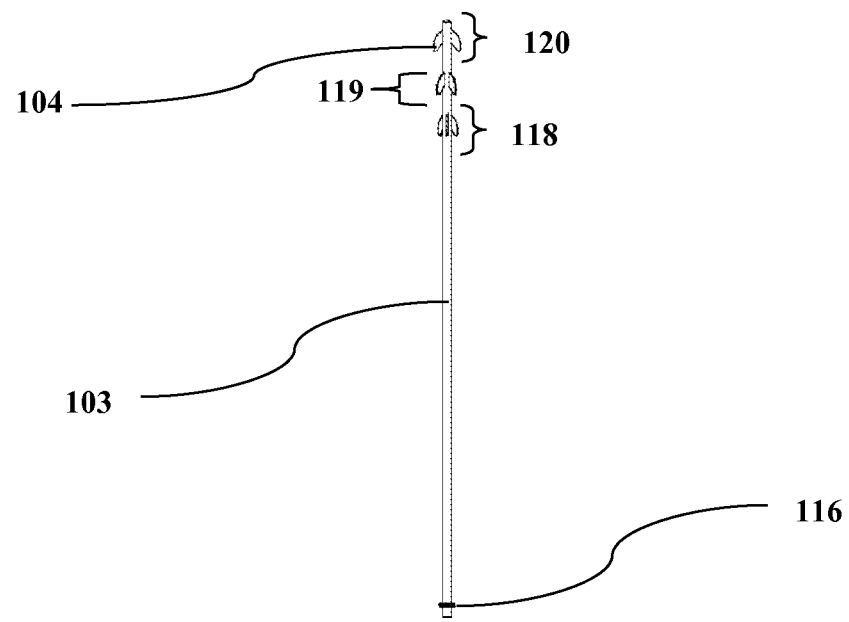
FIG. 14 is top view of blade shaft.
Figure 15:
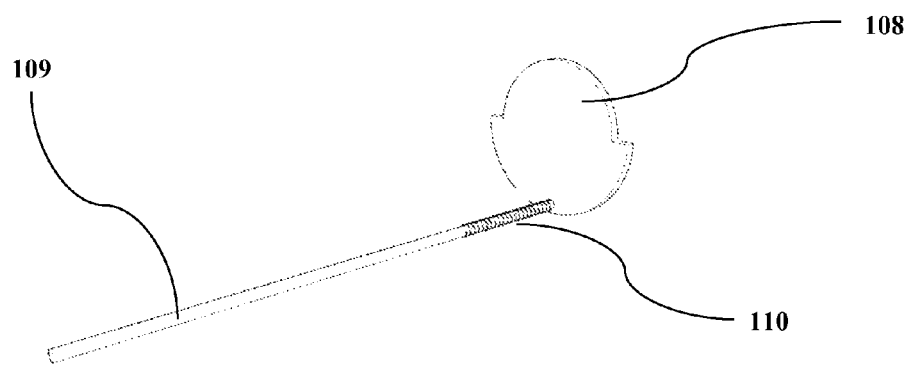
FIG. 15 is a perspective view of back pressure valve.
Figure 16:
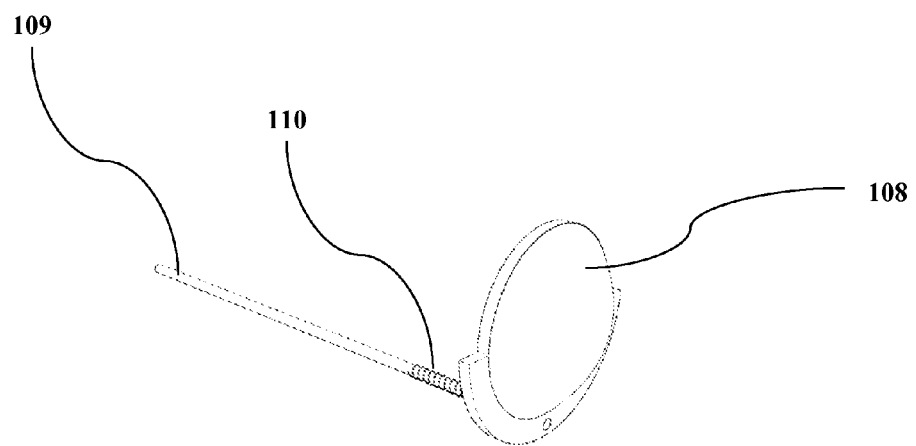
FIG. 16 is another perspective view of back pressure valve.
Figure 17:
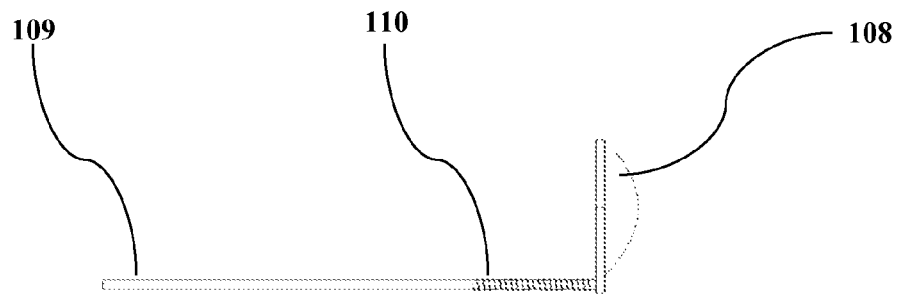
FIG. 17 is a side view of back pressure valve.
Figure 18:
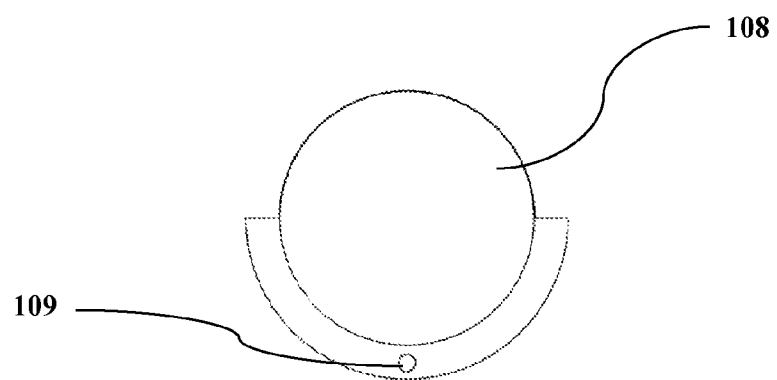
FIG. 18 is a front view of back pressure valve.
Figure 19:
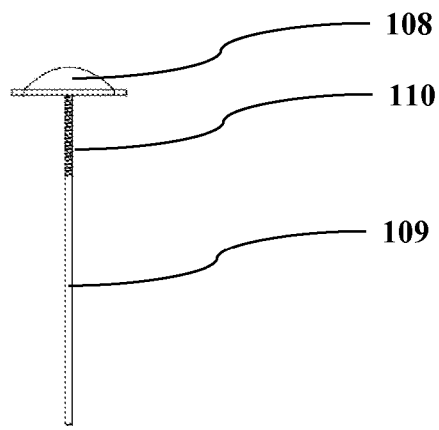
FIG. 19 is a top view of back pressure valve.
Figure 20:
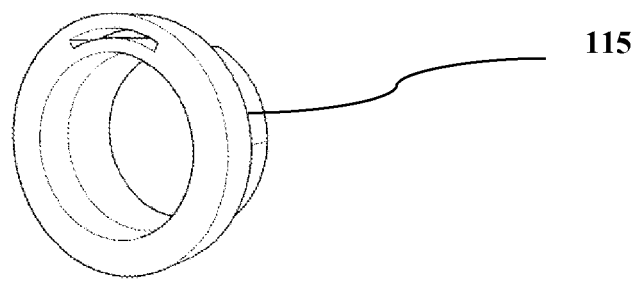
FIG. 20 is a perspective view of back sleeve.
Figure 21:
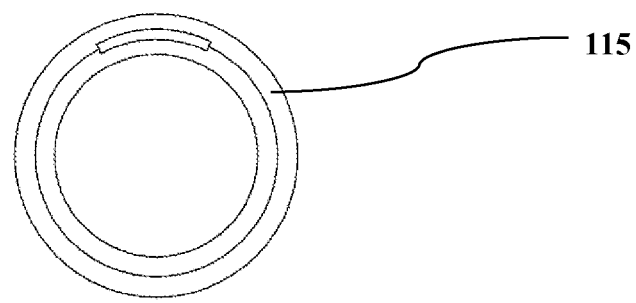
FIG. 21 is a front view of back sleeve.
Figure 22:
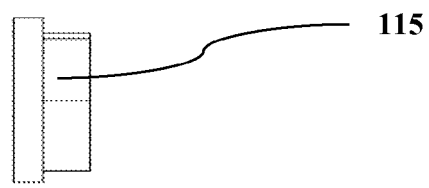
FIG. 22 is a side view of back sleeve.
Figure 23:
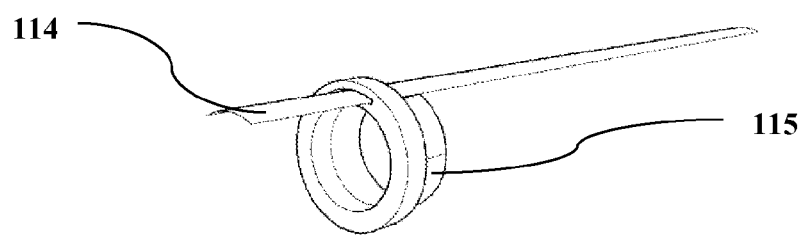
FIG. 23 is a perspective view of back sleeve principally showing inlet port valve connection.
Figure 24:
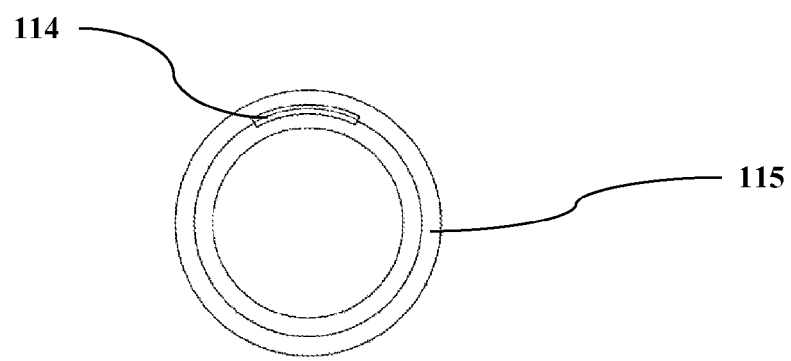
FIG. 24 is a front view of back sleeve principally showing inlet port valve connection.
Figure 25:
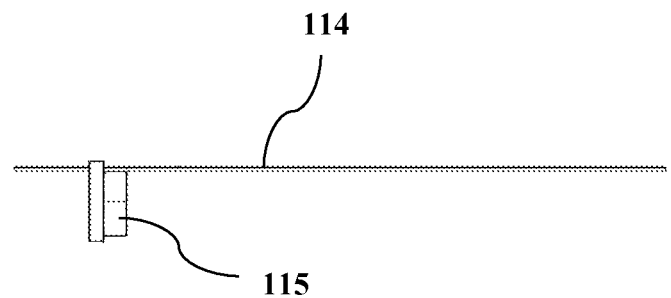
FIG. 25 is a side view of back sleeve principally showing inlet port valve connection.
Figure 26:
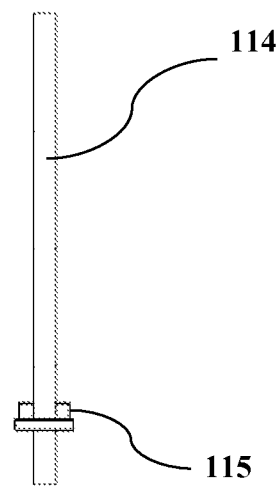
FIG. 26 is a top view of back sleeve principally showing inlet port valve connection.
Figure 27:
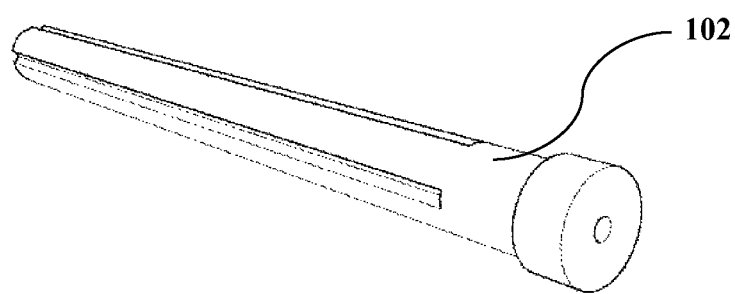
FIG. 27 is a perspective view of piston.
Figure 28:
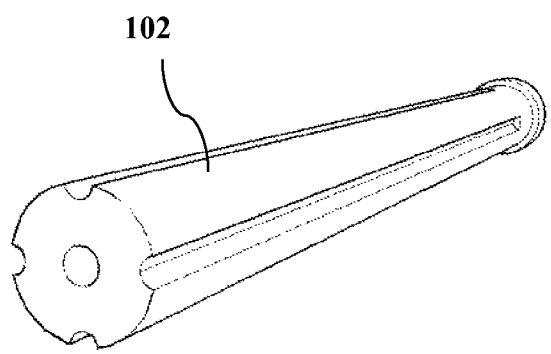
FIG. 28 is another perspective view of piston.
Figure 29:
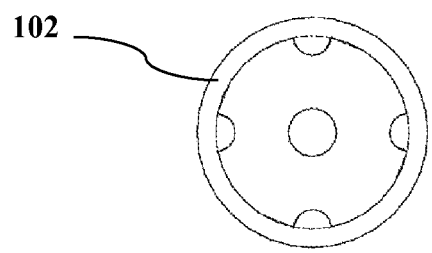
FIG. 29 is back view of piston.
Figure 30:
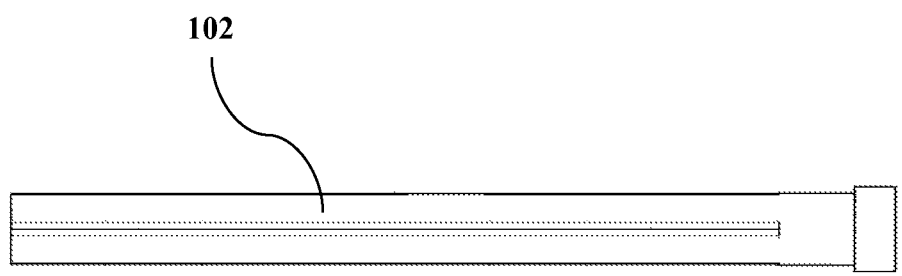
FIG. 30 is a side view of piston.
Figure 31:
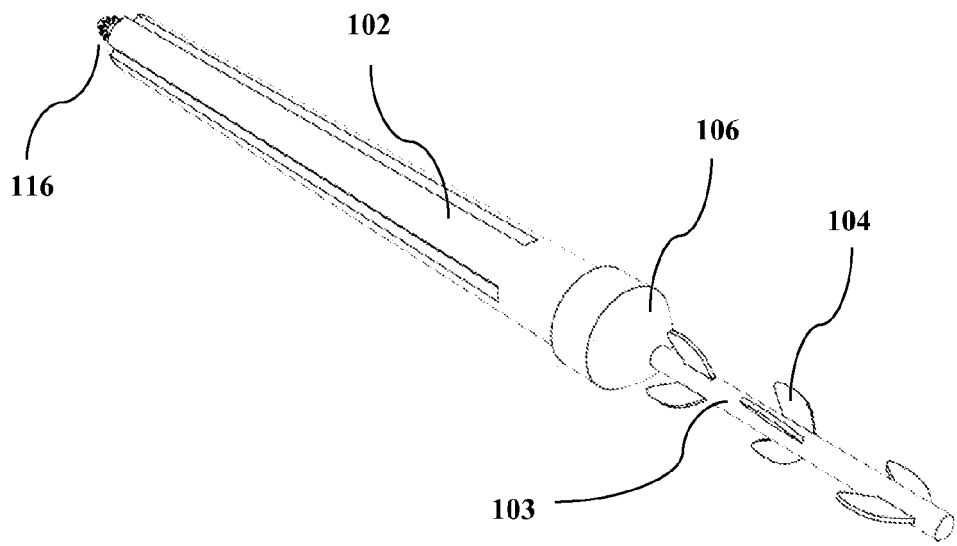
FIG. 31 is a perspective view of piston principally showing assembly of driving gear, blades, blade shaft, and pusher head.
Figure 32:
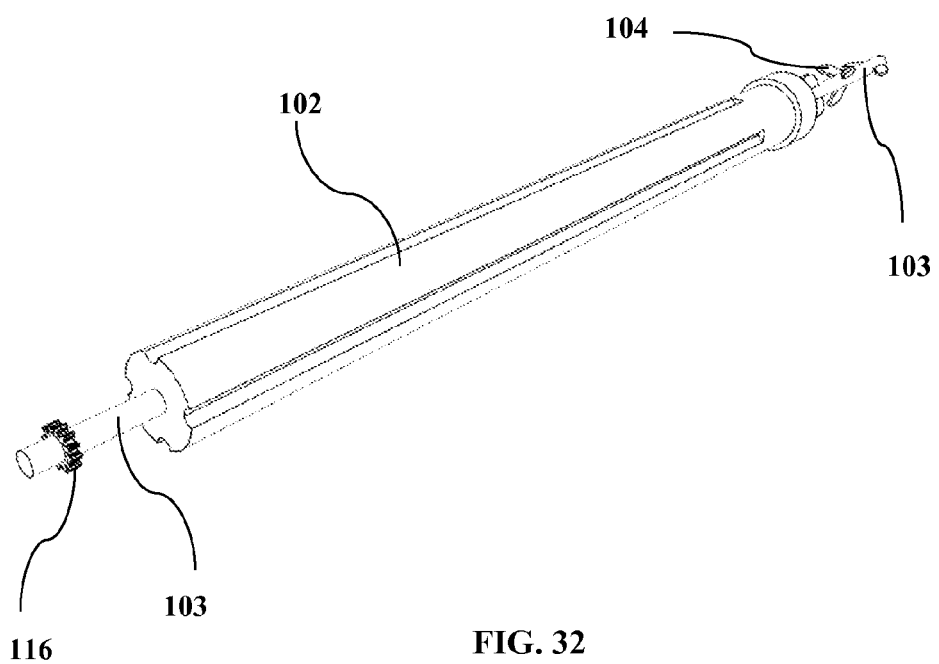
FIG. 32 is another perspective of piston view principally showing assembly of driving gear, blades, and blade shaft.
Figure 33:
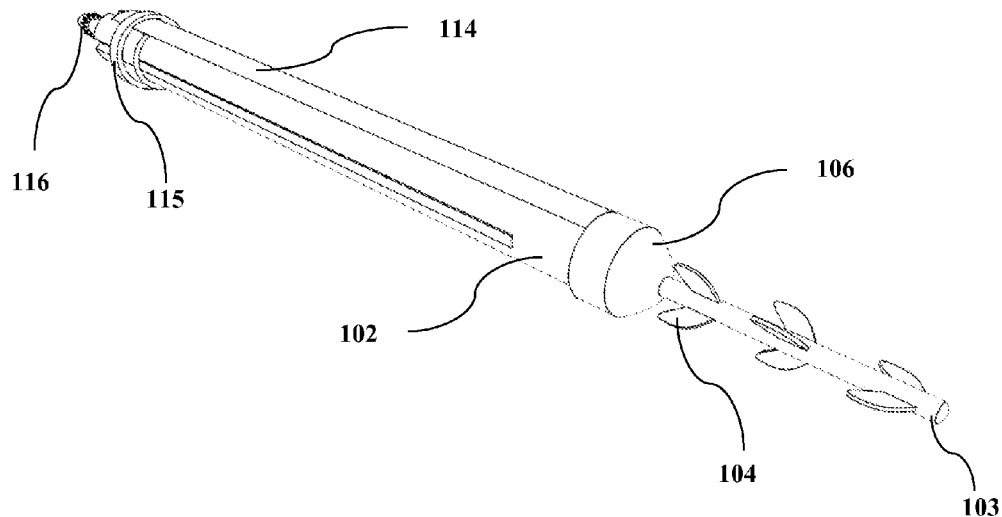
FIG. 33 is a perspective view of piston principally showing assembly of driving gear, blade shaft, blades, pusher head, back sleeve, and inlet port valve.
Figure 34:
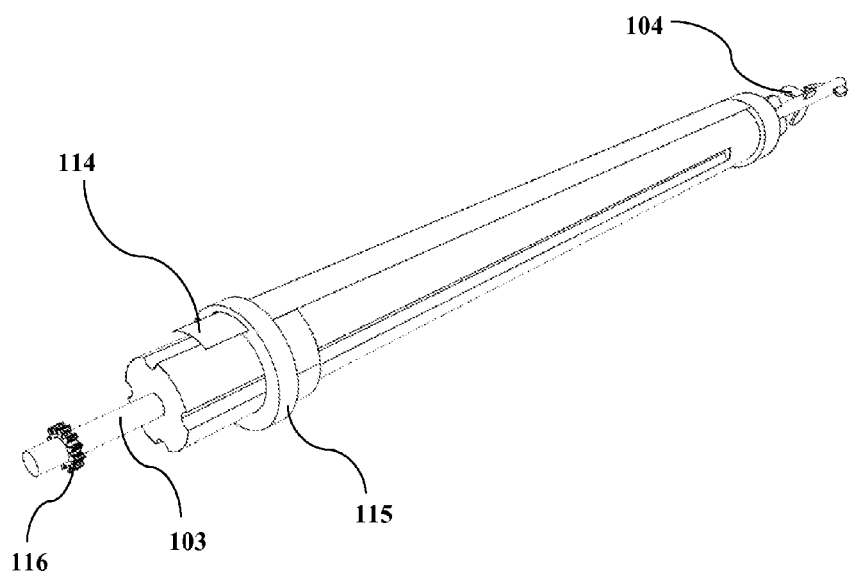
FIG. 34 is another perspective view of piston principally showing assembly of driving gear, blade shaft, blades, back sleeve, and inlet port valve.
Figure 35:
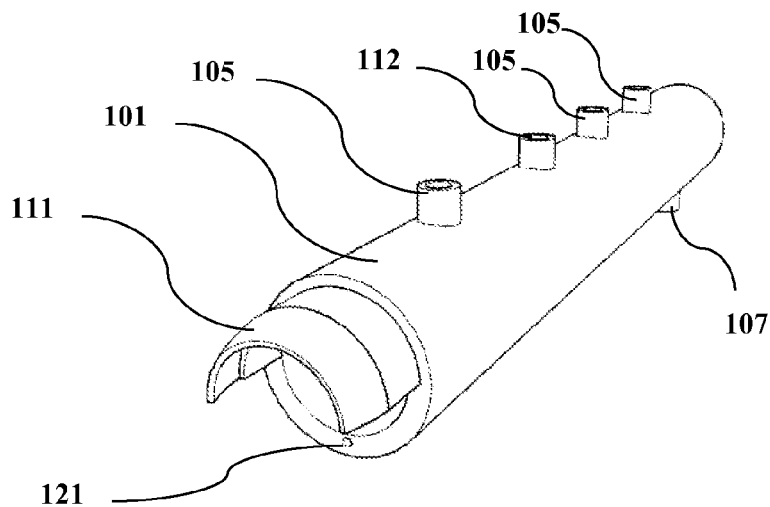
FIG. 35 is a perspective view of chemical reactant injector body portion.
Figure 36:
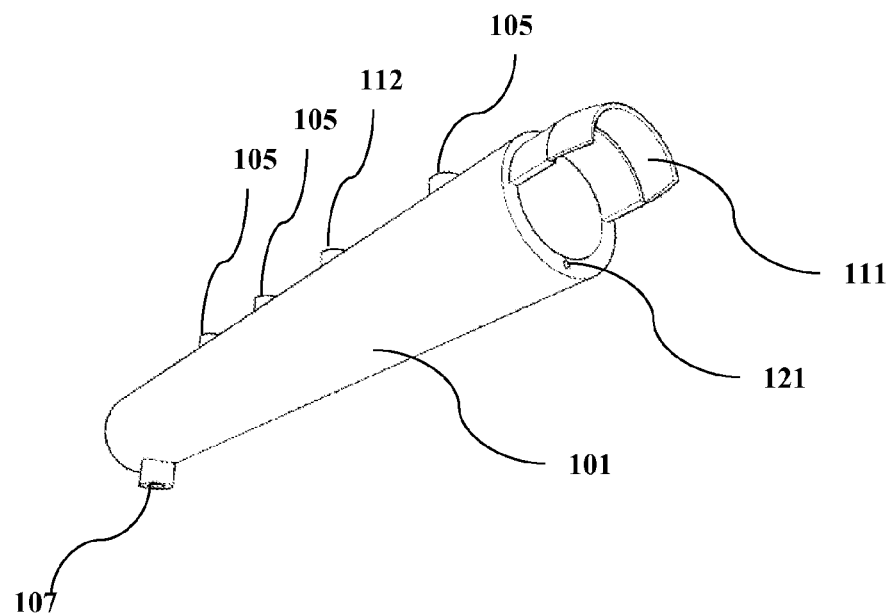
FIG. 36 is another perspective view of chemical reactant injector body portion.
Figure 37:
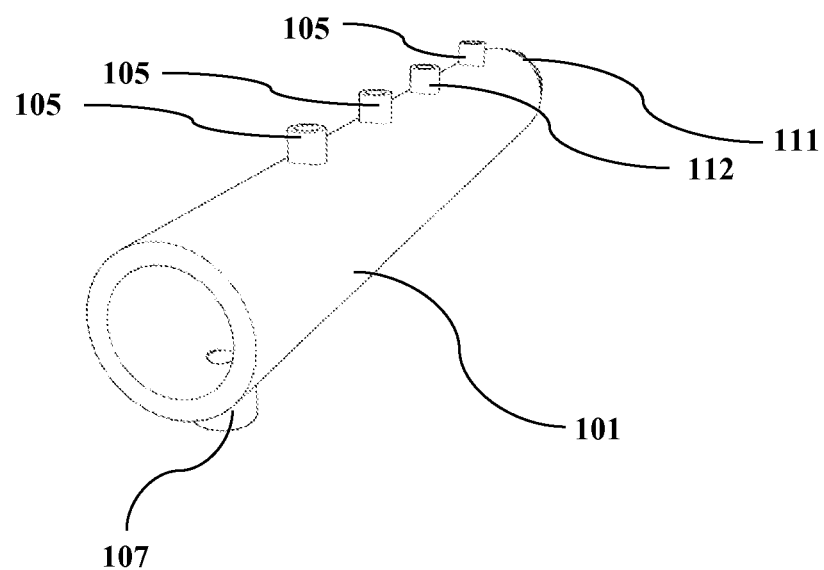
FIG. 37 is another perspective view of chemical reactant injector body portion.
Figure 38:
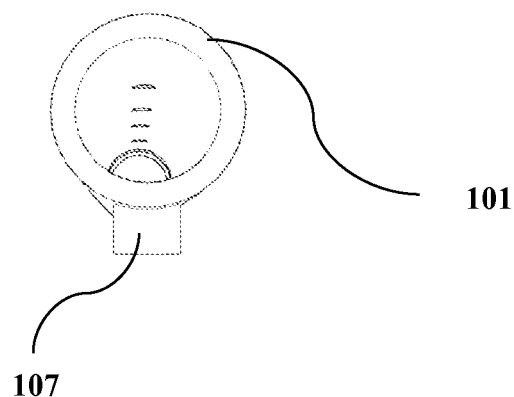
FIG. 38 is another perspective view of chemical reactant injector body portion principally from back.
Figure 39:
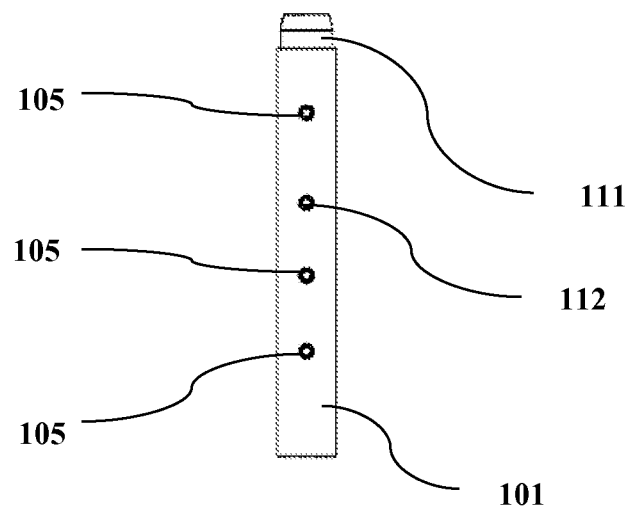
FIG. 39 is a top view of chemical reactant injector body portion.
Figure 40:
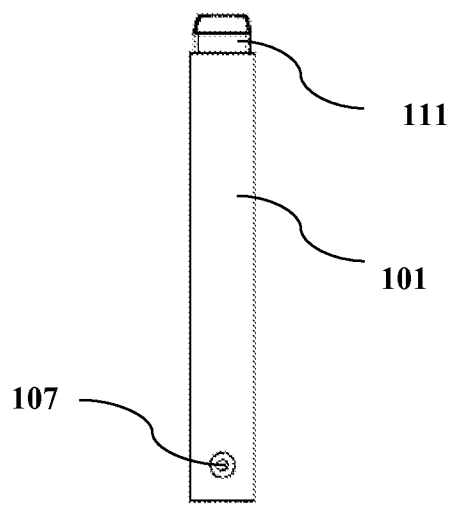
FIG. 40 is a bottom view of chemical reactant injector body portion.
Figure 41:
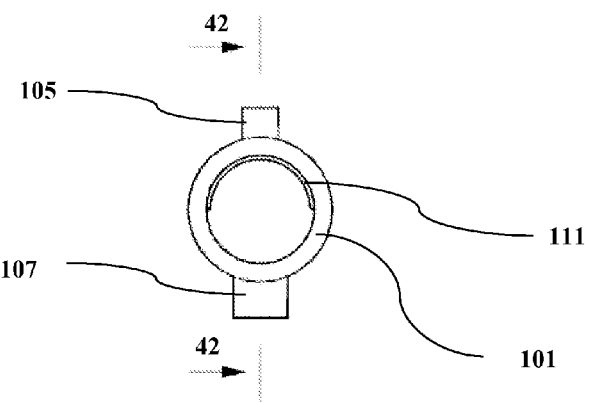
FIG. 41 is a front view of chemical reactant injector body portion principally showing cutting plane location, and view direction.
Figure 42:
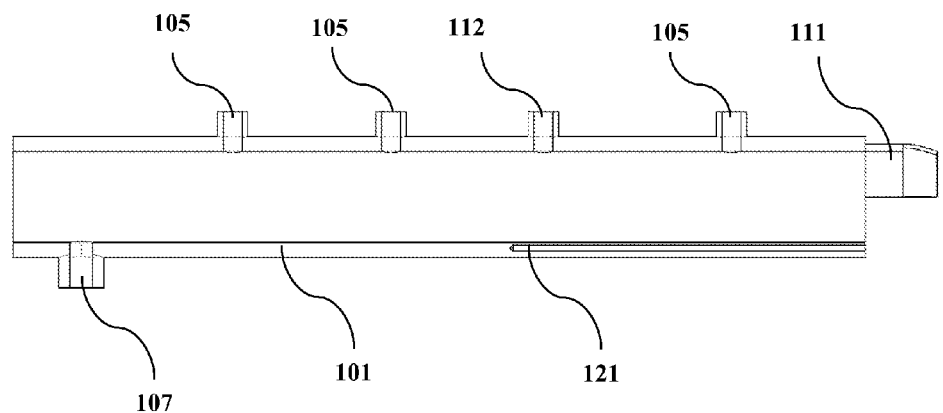
FIG. 42 is a sectional view of chemical reactant injector body portion showing inside holes, and nozzle portion principally looking from right side.
Figure 43:
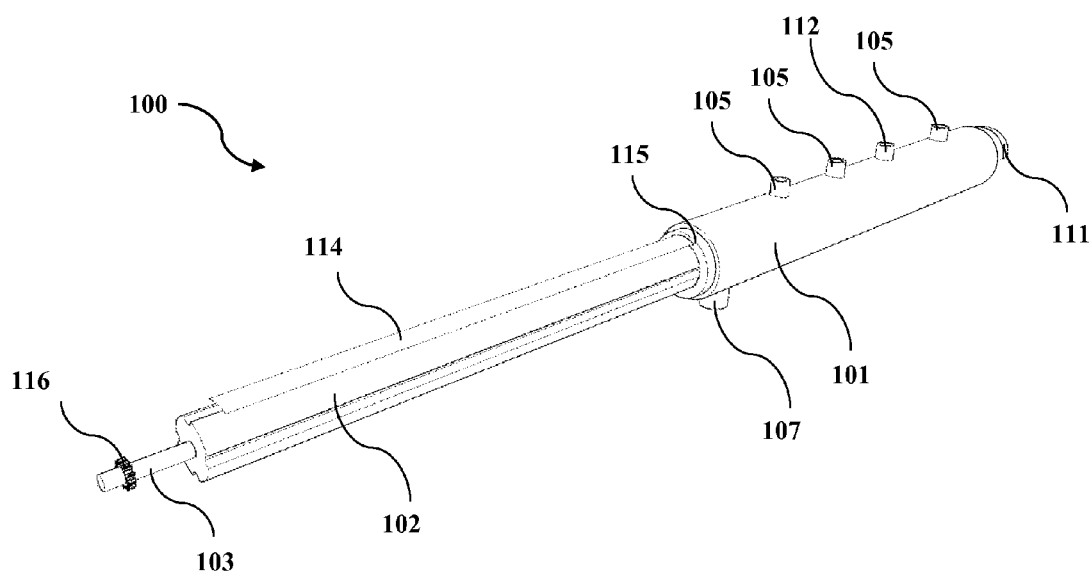
FIG. 43 is a perspective view of chemical reactant injector body assembly principally showing piston, driving gear, back sleeve, inlet port valve, port connectors, and nozzle portion.
Figure 44:
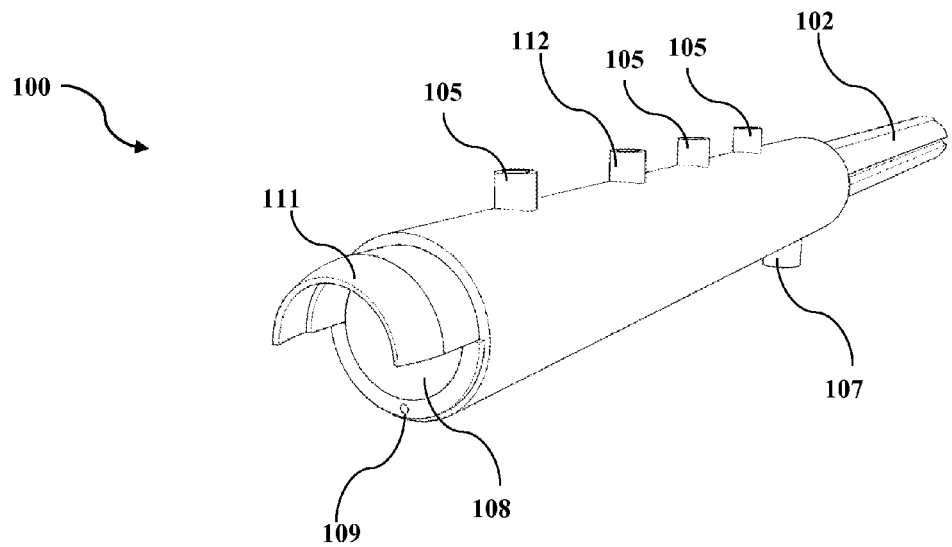
FIG. 44 is another perspective view of chemical reactant injector body assembly principally showing back pressure valve, nozzle portion, port connectors, and piston.
Figure 45:
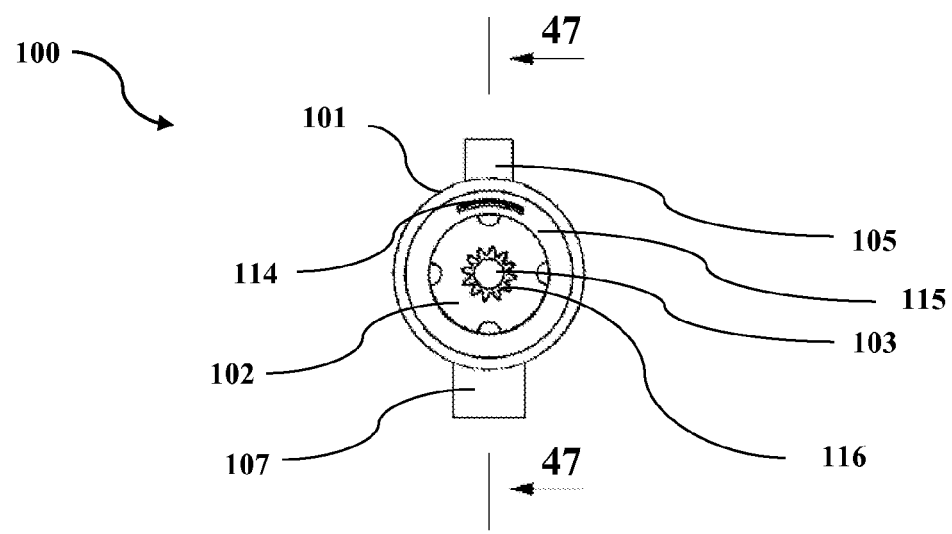
FIG. 45 is a back view of chemical reactant injector body assembly principally showing BB cutting plane view location, and view direction.
Figure 46:
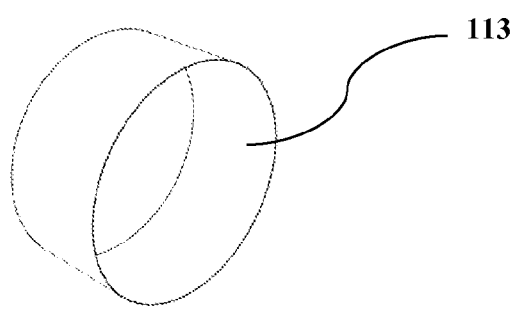
FIG. 46 is a perspective view of solid lubricant containing sleeve.
Figure 47:
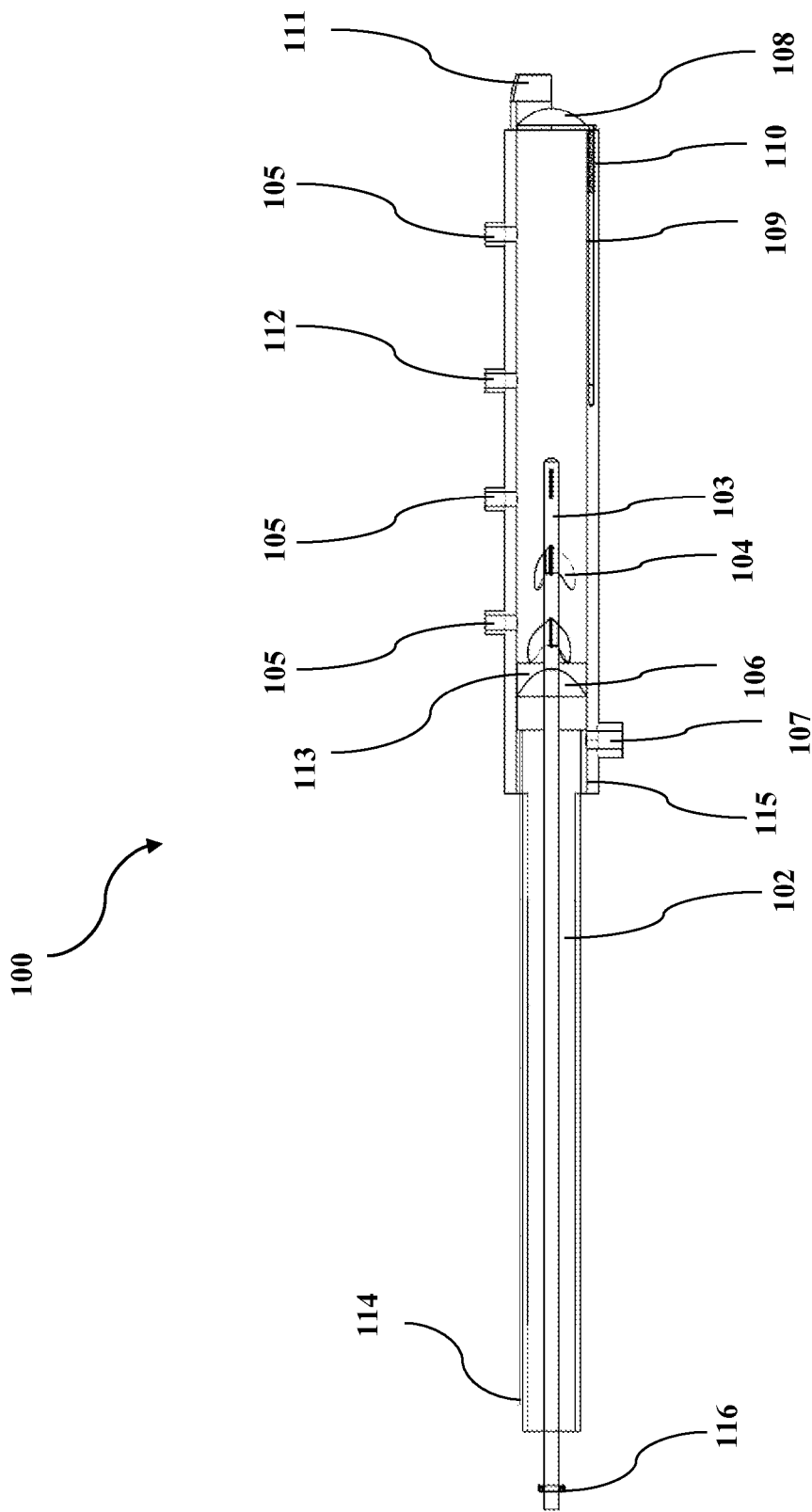
FIG. 47 is a sectional view from BB cutting plane of chemical reactant injector assembly principally showing the initial position of the injector piston assembly.
Figure 48:
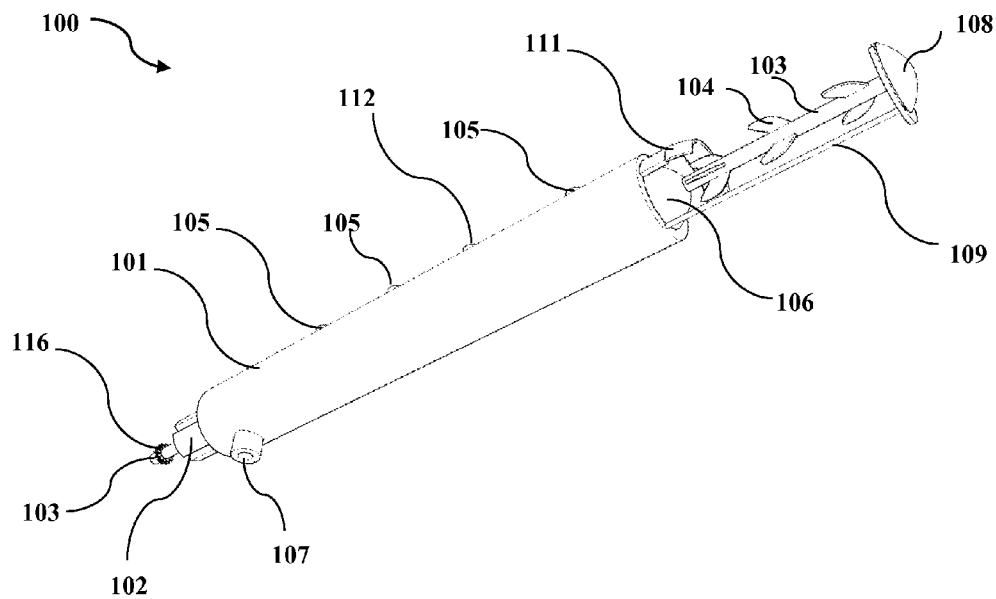
FIG. 48 is a perspective view of chemical reactant injector assembly principally showing the final position of the injector piston assembly, and back pressure valve after the injection of the chemicals.
Figure 49:
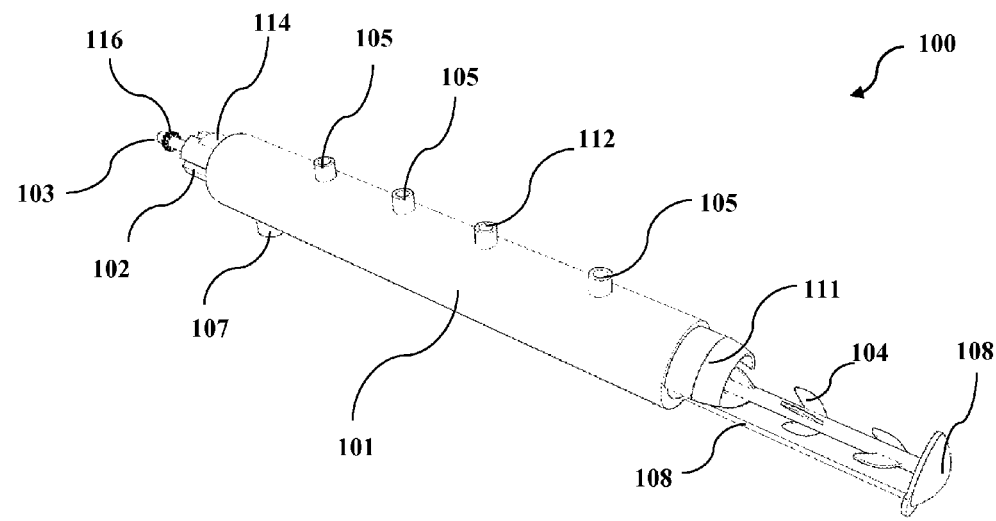
FIG. 49 is another perspective view of chemical reactant injector assembly principally showing the final position of the injector piston assembly, and back pressure valve after the injection of the chemicals.
Figure 50:
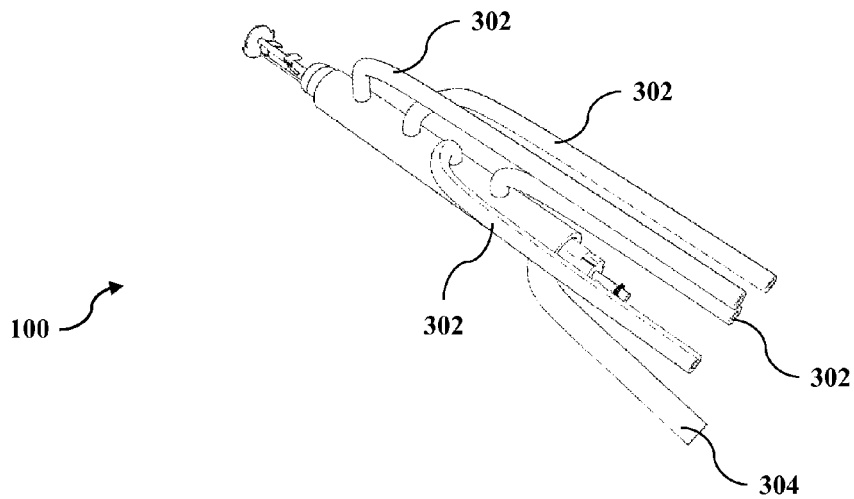
FIG. 50 is another perspective view of chemical reactant injector assembly principally showing supply and discharge pipe line connections.
Figure 51:
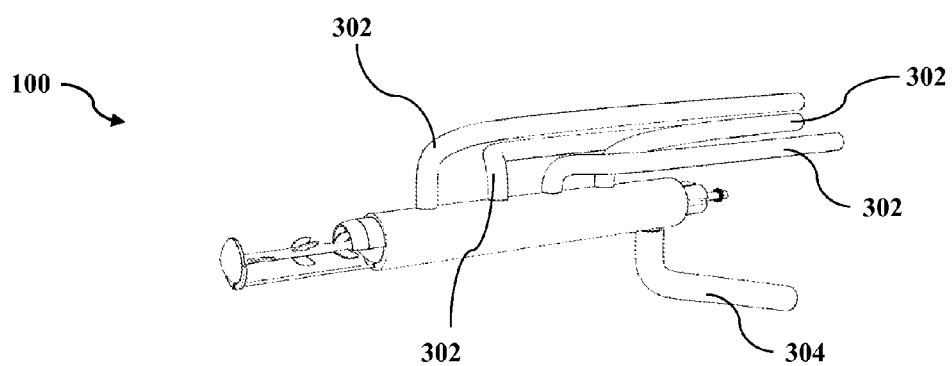
FIG. 51 is another perspective view of chemical reactant injector assembly principally showing supply and discharge pipe line connections.
Figure 52:
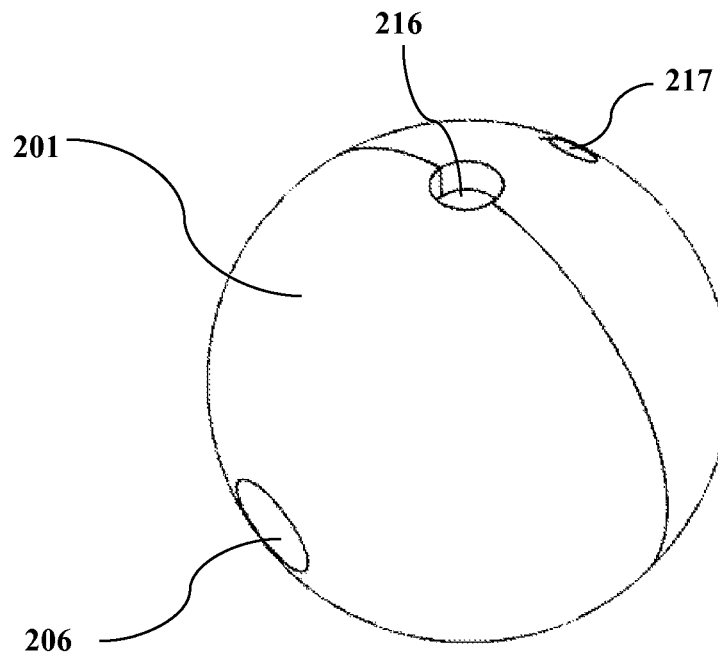
FIG. 52 is a perspective view of reaction chamber body principally from top.
Figure 53:
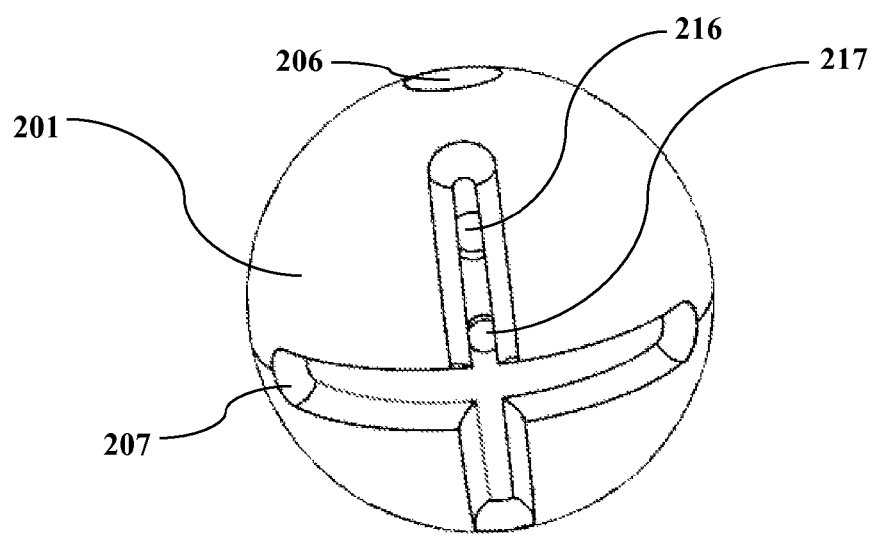
FIG. 53 is another perspective view of reaction chamber body principally from bottom.
Figure 54:
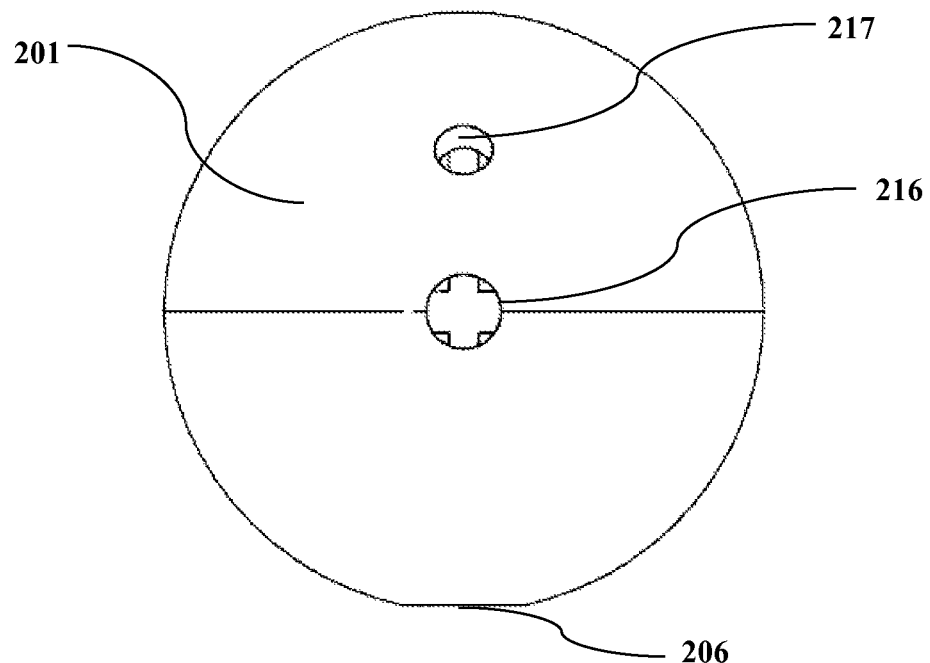
FIG. 54 is a top view of reaction chamber body.
Figure 55:
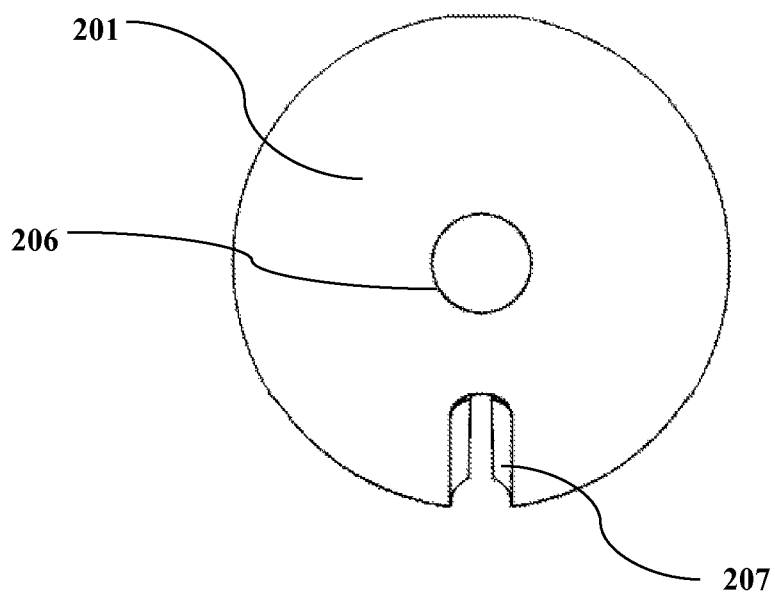
FIG. 55 is a side view of reaction chamber body.
Figure 56:
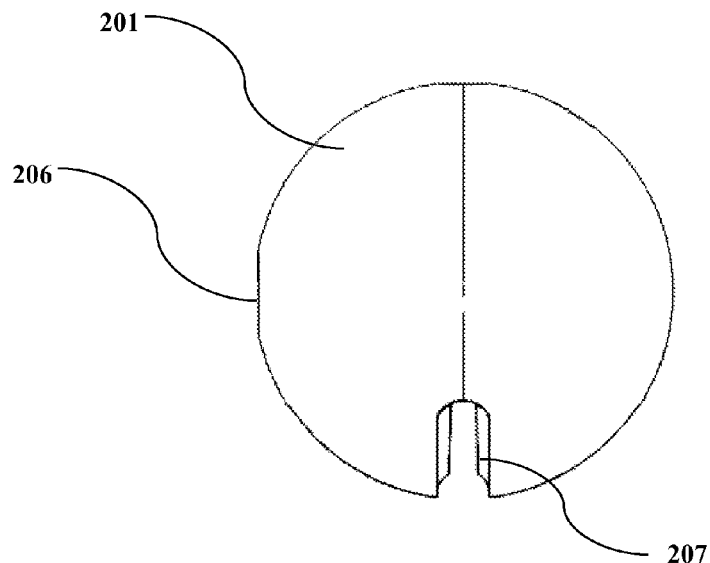
FIG. 56 is another side view of reaction chamber body.
Figure 57:
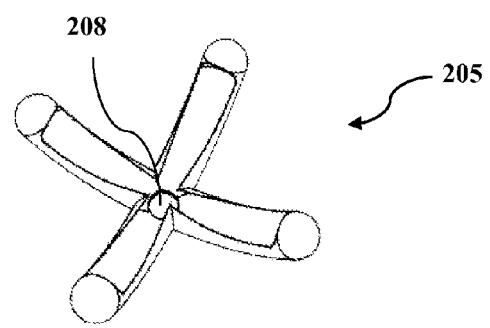
FIG. 57 is a perspective view of collector drain of the chamber body principally showing inside channel forms.
Figure 58:
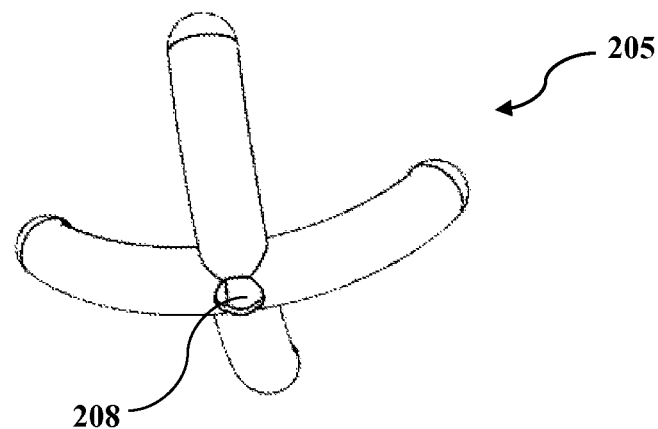
FIG. 58 is another perspective view of collector drain of the chamber body principally showing outside form.
Figure 59:
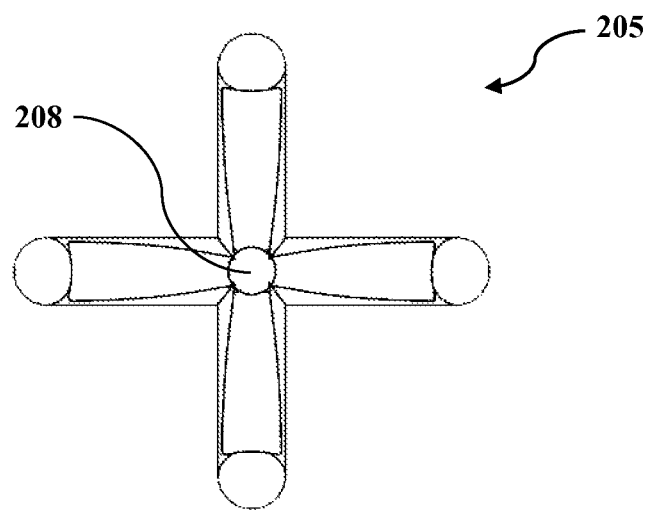
FIG. 59 is a top view of collector drain.
Figure 60:
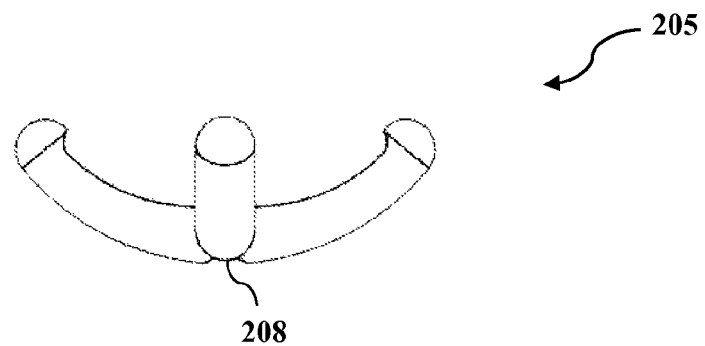
FIG. 60 is a side view of collector drain.
Figure 61:
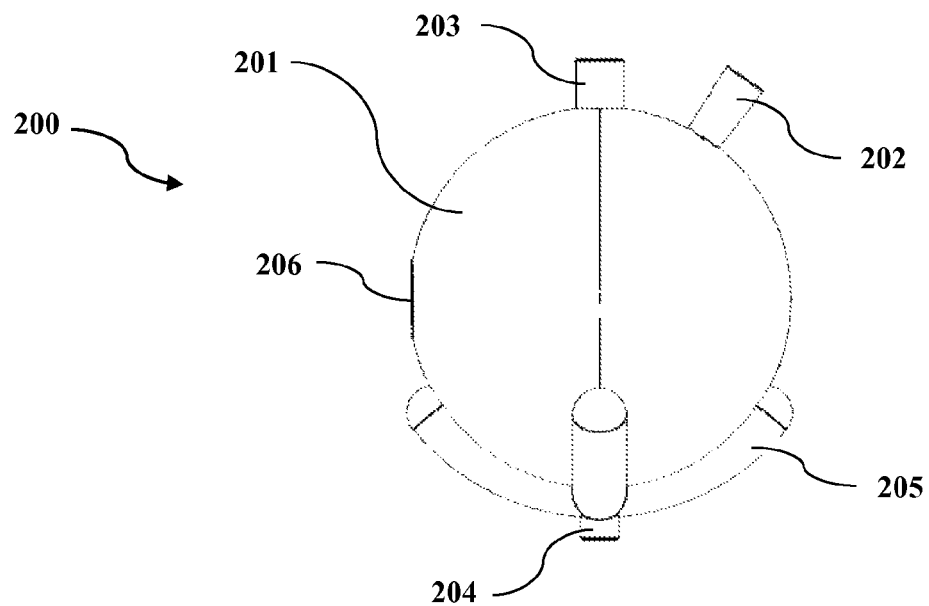
FIG. 61 is a perspective view of chamber core assembly principally showing inlet and outlet ports, injector connection hole, and collector drain.
Figure 62:
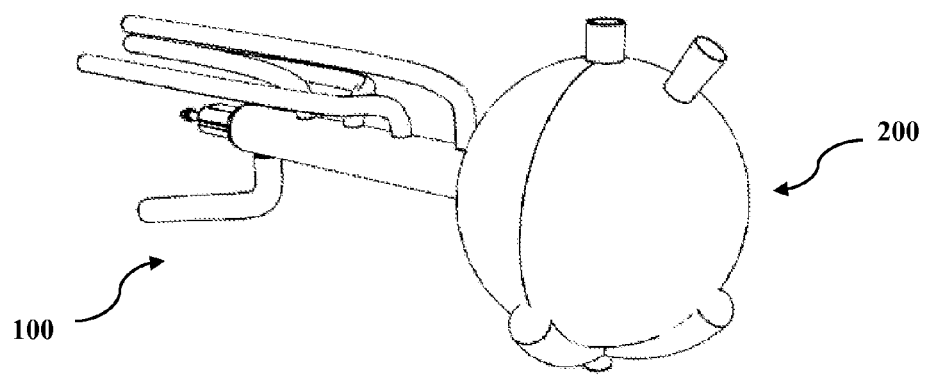
FIG. 62 is another perspective view of chamber core assembly principally showing chemical reactant injector assembly with pipe lines.
Figure 63:
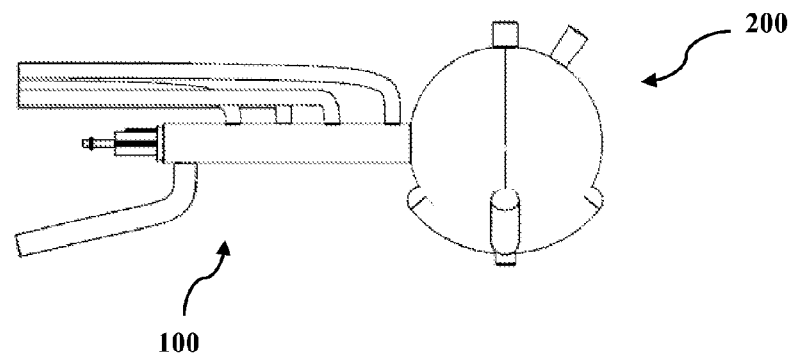
FIG. 63 is another perspective view of chamber core assembly principally showing chemical reactant injector assembly with pipe lines.
Figure 64:
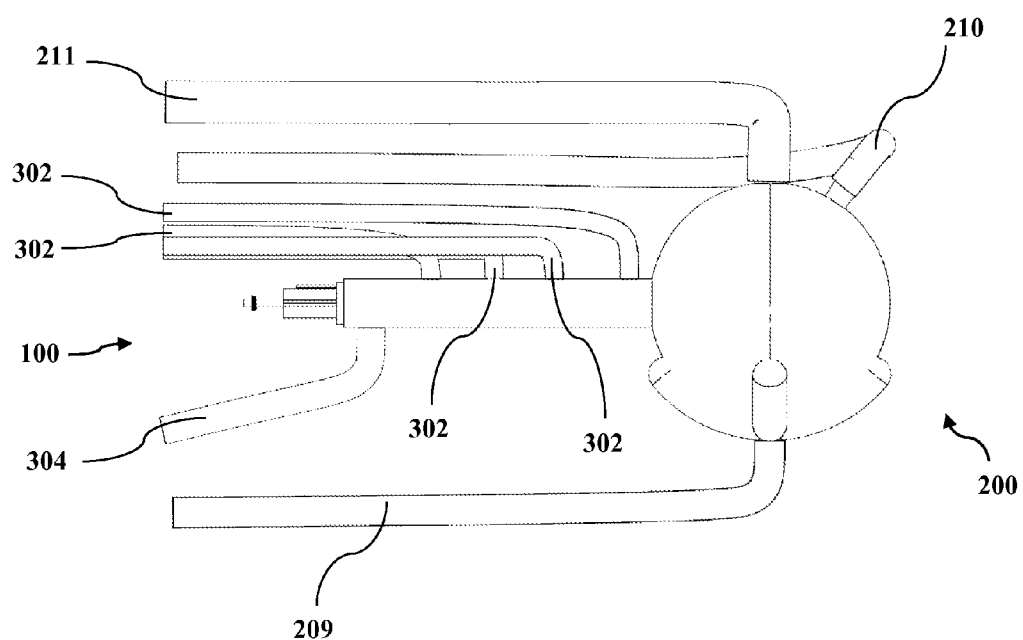
FIG. 64 is another perspective view of chamber core assembly principally showing chemical reactant injector assembly with pipe lines including chamber core pipe line connections.

Referring FIG. 1, low pressure vessel LPV is a closed vessel unit for initial heating of the thermal cycle fluid wherein the low pressure vessel LPV is a steam generator or increased enthalpy gas generator. Referring FIGS. 2, 4, 5, and 6, the exothermic reactor 300 is represented as a low pressure vessel LPV on the schematic view. Low pressure vessel Referring FIG. 1, high pressure vessel HPV is a closed vessel unit wherein temperature and the pressure of the thermal cycle fluid (steam, gas) is increased in order to reach to higher enthalpy levels for target power requirement of the power turbine TRB1. Referring FIGS. 2 and 8, the secondary exothermic reactor 400 is represented as high pressure vessel HPV on the schematic view. Low pressure vessel LPV and high pressure vessel HPV is connected to each other and the circulation of the thermal fluid is controlled by valves and compressors TC1, TC3, and TC3. The valves marked VL1, and VL2 are three way valves, either mono directional or bi-directional from each ways, and activated either manually, electric, pneumatic, hydraulic or remotely. The compressors marked with TC1, TC2, and TC3 are either driven by an electric motor or a power turbine or both simultaneously, and they can be centrifugal, axial or turbo compressors. The power turbine TRB1 is a power turbine connected to a thermal fluid cycle (steam or gas) which generates shaft power to a gearbox GBX unit or directly to an alternator G1 or propulsion unit via clutch systems CL1, and CL2. The alternator G1 charges the main battery unit or supply the main electric line, transformer or capacitor unit. The clutch systems CL1, and CL2 are either hydraulic, mechanic or pneumatic type or combination and are shown as a best mode of application but not limited to. The electric motor M1 is either a DC or AC current motor to power the propulsion system when the thermal cycle is in standby, offline, shut off or whole system is required to be put into silent mode running The electric motor M1 is powered by either main battery unit or PEM (polymer exchange membrane) fuel cells system or simultaneously. The cathode or anode fluid supply tank PFT1 is either a standalone tank or supplied by cathode or anode fluid which is a product of exothermic reaction and is stored inside the discharge tank DT1. The secondary turbine TRB2 is an optional power turbine to be used when returning high pressure thermal fluid is completely or partially diverted to low pressure vessel LPV (exothermic reactor 300) and is used to lower the pressure of the thermal fluid slightly above the pressure level inside the low pressure vessel LPV and benefit from the enthalpy drop during the pressure reduction inside secondary turbine TRB2 by connecting to a secondary alternator G2 which charges an auxiliary battery unit or supply the main or substantial electric power line as a secondary power source or connected to a compressor or another auxiliary equipment such as pump. The propulsion unit as indicated on the appended figure comprises a propeller, pump-jet, water-jet, wheel drive, and gear-drive but not limited to.

Referring to FIG. 1, the chemical supply tanks TK1, TK2, and TK3 are the storage vessels for supplying exothermically reactant chemicals to the injector assembly set 10 and reaction core assembly set 20. Number and size of chemical supply tanks TK1, TK2, and TK3 can be increased or decreased depending on the number and type of the chemicals that will be used for exothermic reaction cycle.

Referring to FIG. 1, the primary reactant chemical tank PT1 is the storage vessel for supplying primary chemical reactant into the reaction core assembly set wherein the chemicals in the supply tanks TK1, TK2, and TK3 are exothermically reactive to the chemical inside the primary reactant chemical tank PT1. Number and size of primary reactant tank PT1 can be increased or decreased depending on the number and type of the chemicals that will be used for exothermic reaction cycle.

Referring FIG. 1, the injector core assembly set 10 comprises of at least one or multiple chemical reaction injectors 100 wherein the best example apparatus is described in the following embodiments as a best mode of application but not limited to.

Referring FIG. 1, the reaction core assembly set 20 comprises of at least one or multiple chemical reaction chambers 200 wherein the best example apparatus is described in the appended embodiments of the invention as a best mode of application of the invention but not limited to.

In the appended embodiments of the invention an example for the low pressure vessel LPV is shown as an exothermic reactor 300, and an example of high pressure vessel HPV is shown as a secondary exothermic reactor 400 wherein the embodiments are the best mode of application of the invention but not limited to.

Referring FIG. 1, the thermal fluid supply tank MT1 is the source tank of the fluid which is used as the main medium of the thermal cycle and can be water, air or any gas to be supplied to the power turbine TRB1, and secondary power turbine TRB2.

Referring FIG. 1, as a best mode of application, in case the primary reactant is selected as water and the thermal cycle fluid is selected as steam, then the primary reactant tank PT1 can be eliminated and the thermal fluid supply tank MT1 is also connected to the primary reactant line with a separate supply output from the thermal fluid supply tank MT1. It is important that if water is selected as a primary reactant then the water should be distilled pure water in order to increase the efficiency of the exothermic reaction at maximum and may need to be supplied from a different tank system such as the primary reactant tank PT1 can be used for this purpose. Using a separate water supply for the chemical reaction will give flexibility to use alternative water sources under emergency conditions supplying sea water to the thermal cycle when the thermal fluid is water (steam).

Referring FIG. 1, the heat exchanger EX1 is connected to the discharge line of the reaction core assembly set 20 wherein the exothermic reaction products inside the reaction chambers 200 is in gaseous state due to high temperature and some reaction products like Oxygen is needed to be separated for supplying breathing air unit AT1 or PEM fuel cells as a cathode fluid. The heat exchanger EX1 can the cooled by water, forced air system or refrigeration fluid. The heat exchanger EX1 has two discharge outputs which one for gaseous state products and the other is for fluid or solid state products.

Referring FIG. 1, the discharge tanks DT1, and DT2 are connected to the outputs of the heat exchanger EX1. The number and size of the discharge tanks can be increased or decreased according to the power requirement, and their sizes have direct ratio with the chemical reactant flow to the reaction chambers 200.

Referring FIG. 1, embodiment is a process flow diagram of the invention. According to the diagram thermal fluid is charged to the low pressure vessel LPV, from thermal fluid supply tank MT1. During charging process of the low pressure vessel LPV, the exothermic reaction cycle is started by first sending the chemical reactants from supply tanks TK1, TK2, and TK3 to the injector assembly set 10 to be mixed and then to be pulverized into the reaction chambers 200. As the chemical reactants are charged into the reaction chambers 200, the primary reactant from primary chemical tank PT1 is diverted directly to the reaction chambers 200 to be pulverized inside the reaction chamber 200 for starting the exothermic reaction. As the exothermic reaction starts then the heat transfer to the thermal fluid inside the low pressure vessel LPV starts. The exothermic reaction products are transferred to the discharge lines and then to the heat exchanger EX1 from the discharge ports of the reaction chambers 200. The separated discharge products are sent to discharge tanks DT1, and DT2 wherein the discharge tank DT1 is for gaseous state products and other discharge tank(s) DT2 is for solid or fluid state products. The exothermic cycle on the low pressure vessel side continues until the target thermal conditions (temperature, pressure) for the thermal fluid is reached. According to the thermal fluid conditions, the exothermic reaction cycle is controlled by a computerized control unit adjusting the chemical flow inside the reaction chambers 200 for maintaining the target temperature, pressure parameters of the thermal fluid. One or several of the chemical reactant supply tanks TK1, TK2, and TK3 can be used as a booster reactant chemical supply which the booster reactant chemical has a higher enthalpy output during exothermic reaction for fast start or for elevated thermal output.

Referring FIG. 1, once the thermal fluid reaches the target thermal conditions on the low pressure vessel LPV side, the thermal fluid is sent to high pressure vessel side HPV. If the pressure is lower on the high pressure vessel HPV than low pressure vessel LPV then the thermal fluid is transferred to the high pressure vessel HPV without any forced flow until the pressure increases to an equal level of the low pressure vessel LPV. Once the pressure equalizes on both sides then the thermal fluid is sent to high pressure vessel HPV by a turbo compressor TC1. Once the thermal fluid start to enters into the high pressure vessel HPV, the exothermic cycle on the high pressure vessel HPV side starts in same working regime as on the low pressure vessel LPV side but this time the exothermic reaction cycle is controlled according to the target parameters of the thermal fluid on the high pressure vessel HPV side which are set according to the power turbine TRB1 design calculations.

Referring FIG. 1, the thermal fluid from the high pressure vessel HPV is sent to a power turbine (steam, gas). The valve VL1 is a multiway valve which is used to split the thermal fluid according to the inlet flow rate and the admission or control stage of the power turbine TRB1. The returning thermal fluid from the output of the power turbine TRB1 is sent back to high pressure vessel HPV by turbo compressors TC2, and TC3. There are two main returning line of the thermal fluid from the power turbine TRB1 outlet as one of the line is from the extraction stage of the power turbine TRB1 which has a higher back pressure and lower flow rate and the other is the final output which has a lower back pressure than extraction stage but higher flow rate than extraction stage but not limited to. Turbo compressors TC2, and TC3 is required to send the returning thermal fluid back to the pressure vessels LPV, and/or HPV for reheating or achieving thermal cycle parameters (enthalpy, temperature, pressure).

Referring FIGS. 9-51, embodiments of a chemical reactant injector 100 assembly having improved use in exothermic reactor in order to pump the chemical reactants into the reaction chambers are provided in accordance with the invention. The agent injector is especially used to inject solid type chemical reactants into the reaction chamber. The chemical reaction injector 100 assembly is used for state form of chemical reactants which are either in gel, semi-liquid or liquid states. The chemical reactant injector 100 assembly comprises a body portion 101 and a nozzle portion 111 extending from the body portion 101, a main piston together with its shaft 102 including a pusher head 106 which is driven by an electro-mechanical, manual or hydraulic or pneumatic system for injecting the chemical reactant(s) that comes from the inlet ports 105, 112 into the reaction chamber connected with. The blade shaft 103 connected with multiple number of blades 104 is driven by a driving gear 116 which is driven by a servo motor or any other means of forces, enables the chemical reactant to have a vortex to flow throughout the outlet nozzle 111 and protects the blockage of the reactant due to its solid, semi-solid or jelly formation. There are preferably eight blades 104 are located on the blade shaft 103. The blades 104 are positioned as in three groups on the blade shaft 103. First and second blade groups 118, 119 are consisting of three blades 104 which are positioned among themselves with generally 120 degrees to each other around the shaft perimeter. The third blade group 120 is consisting of two blades 104 which are positioned among themselves with 180 degrees. The blade shaft 103, and blade groups 118, 119, 120 revolve during the injection period of the piston group 102, 106. The blade shaft 103 has four concave half-cylinder block type longitudinal side channels which prevent the clogging of the motion due to chemical reactant remaining inside the injector body 101. The pusher head 106 has a convex type conical form which leads a smooth aerodynamic movement of the main piston 102. The nozzle portion 111 gives a direction to the reactant to be diverted directly to the reaction area where meets with the other reactant inside the reaction chamber. There is a back pressure shaft hole 121 inside the injector body 101 for the back pressure shaft 109, and back pressure spring 110 assembly. The back pressure valve 108 is opened by the movement of the blade shaft 103 and compressed by the back pressure spring 110, and back pressure shaft 109 to return back to its original position after piston 102, and blade shaft 103 moves to their initial position. Backpressure valve 108 prevents the inlet of the reaction products like gases under high pressure into the body portion 101. Inlet port valve 114 slides together with the main piston 102 in order to block the entry of the chemical reactant back of the main piston 102, and body portion 101 during injection movement. This inlet port valve 114 can be used for arranging the dosage based on the adjusted initial position of the piston prior to the injection. The drain port 107 enables to drain out any excessive material remains after the injection movement. The remaining material inside the body portion 101 comes along with the piston 102 back to the drain valve 107 with the pressure inside the body portion 107. Pusher head 106 improves the aerodynamic profile of the main piston 102, and ensures to push out the most of the remaining reactant at the very end of the body portion 101 where it connects with the nozzle portion 111. Back sleeve 115 keeps the piston 102, inlet port valve 114, pusher head 106 aligned with the center of the movement and body portion 101. Inlet port 112 or of the any other inlet ports 105 can be connected to different agents for enabling mixture of the reactant combination before the main reaction inside the reaction chamber. The solid lubricant containing sleeve 113 which is located around the initial position of the piston 102 reduces friction between the piston 102 and inner layer of the body portion 101. The inlet ports 105, 112, and drain port 107 is also used for flushing and cleaning the injector pump when connected to an appropriate cleaning agent line that is compatible with the injected reactants.

Referring FIGS. 52-64, the embodiments of a reaction chamber 200, and a reactant injector 100 assemblies having improved use in exothermic reactor 300 assembly in order to realize the chemical reaction and heat transfer. The invention has a reaction chamber 200 which has a spherical reaction chamber body 201 shown herein but not limited to, and has preferably three ports 202, 203, and 204 on the chamber body 201 which are used as inlet, and outlet for the chemical reactants and reaction products. The number of ports may be increased or decreased depending on the exothermic chemical reaction types according to the used chemical agent kinds. The invention has a collector drain 205 which is for collection of liquid or solid state chemical reaction products to be drained out of the reaction chamber body 201. The invention has a chemical reactant injector 100 connection hole 206 on the surface of the chamber body 201 which the chemical reactant injector 100 is assembled to the reaction chamber body 201. The invention has a connection flange 320 for connecting the reaction chamber 200 assembly to the exothermic reactor body 301. There is a fluid supply inlet 317 at the bottom of the exothermic reactor body 301 for initial filling of the liquid to be heated and for top up purposes. The steam exit 318 of the heated fluid is located at the top of the exothermic reactor body 301. There is a fluid return inlet line 314 at the top of the exothermic reactor body which has several numbers of gas diffusers 319 on and at the end of the line inside the exothermic reactor body. These diffusers are commonly used ones in steam generators for distributing the returning steam more homogenously into the cylinder body. There is a fore head cap 312 and aft head cap 313 at the end of the cylindrical exothermic reactor body 301. The reaction chamber body 201 has drain channel form 207 which is a cross sectional form of two crossing cylinders.

Referring FIGS. 52-64, and FIGS. 2-8, the reaction chamber 200 has a spherical body part 201 for providing homogenous heat transfer to the fluid outside the reaction chamber body 201. The said fluid is inside the exothermic reactor body 301, and may be steam, or any type of appropriate fluid in gas or liquid state.

Referring FIGS. 52-64, and FIGS. 2-8, the invention has an upper angled top side port 202 which is for pulverizing secondary chemical agent which initiates the exothermic reaction. The said secondary chemical can either be in fluid, solid or gas state. The said upper angled top side port 202 is connected to the reaction chamber 200 through a hole on the surface of the reaction chamber body 201 and connected to a supply line 305 with a supply line pipe 210. A nozzle, pulverizer or bidirectional pneumatic or solenoid valve device may be added and connected to the said upper angled top side port 202. The angle of the upper angled injection port 202 may be between 2 to 45 degrees relative to the normal centerline of the collector drain hole 208. The upper angled top side port 202 may be used for vacuuming, and flushing, and on the supply line pipe 210 connected to the said upper angled top side port 202 a bi-directional, tri-directional, or venturi type valves may be added in order to use the said upper angled top side port 202 for bidirectional use.

Referring FIGS. 52-64, and FIGS. 2-8, the invention has an upper vertical top port 203 which is for vacuuming the gas products coming from the result of the exothermic reaction. The said upper vertical port 203 is connected to the reaction chamber 200 assembly through a hole on the surface of the reaction chamber body 201 and connected to a suction pipe 211. The said upper vertical top port 203 is preferably aligned with the spherical center of chamber body 201 and center of the drain hole 208. The said upper vertical top port 203 may be used for injection of chemical agents or catalyzers or may be used for both injection and vacuuming purposes when connected with a bidirectional pneumatic or solenoid valve.

Referring FIGS. 52-64, and FIGS. 2-8, the collector drain 205 has a form consisting of having spherical ended sides of two empty cylinder form crossing each other with 90 degrees on a horizontal plane and a drain hole 208 at the center of the said crossing location lower face. Almost half of the upper parts of the said cylinders are cut-off and left open for collecting the reaction products inside the reaction chamber body 201. There hole 208 on the surface of the said collector drain 205 is connected to a drain pipe 209 through a discharge port 204. The collector drain 205 may be a separate part which is welded or may be a combined design form merged with the chamber body part 201.

Referring FIGS. 52-64, and FIGS. 2-8, the invention has a connection flange 320 which aligns and connects the reaction chamber 200 assembly to the exothermic reactor body 301. The connection flange 320 is the connection part to the cylinder wall of the exothermic reactor bodies 301, and 405.

Referring FIGS. 52-64, and FIGS. 2-8, the invention has an exothermic reactor body 301 which contains numbers of reactor chambers 200, and in one of the following embodiments the number of reactor chambers 200 is 20. The said reaction chambers 200 are arrayed inline, and they are located symmetrical on each sides of the exothermic reactor body 301 (ten reaction chambers 200 on each side). The ports of the said reaction chambers 200 are connected to pipe lines 302, 303, 305, and 306. The chemical inlet ports 112 and 105 of the reactant injector 100 are connected to the main chemical reactant agent supply line 302 with pipe 311 in connection with a standard or universal type of any known proportional and directional valve 307 either controlled pneumatically or with an electronic servo controller. The chemical inlet port 112 may further be connected to separate chemical lines when any other chemicals may be used with the said connection valve style. The chemical inlet ports 105 may further be connected together or separately or in any combination of to one or multiple chemical lines when any other chemicals may be used with the said connection valve style. The discharge ports 204 are connected to the discharge line 303 with a drain pipe 209. There are check-valve systems 308, and 310 on drain pipes 309, and 315 connected to the discharge line 303. The said check-valve systems 308, 310 are for blocking the return of the drained chemicals to the reaction chamber 200 and injector 100. The drain ports 107 of the reactant injectors are connected to the discharge line 304 with a drain pipe 309. There is a check-valve system 310 on connection of drain pipe 309 and discharge line 304 which is for blocking the return of the drained chemicals to the reactant injector 100 assembly. The upper angled top side ports 202 are connected to the secondary reactant supply line 305 with a supply line pipe 210 in connection with a standard or universal type of any known proportional and directional valves including a servo valve system 316. The upper vertical top ports 203 are connected to suction transfer line 306 with a suction pipe 211. Each suction pipe 211 is connected to the suction transfer line 306.

The other purposes of the said valves are to control the flow rate of the chemicals to be pumped in, to control the sequence of the pumping to the chemical reactant injectors 100 as well as to the reaction chambers 200 assemblies or by other means to enable the working of the reaction chambers in a sequence or in a timing order one after another similar to piston movement cycle in a diesel or gasoline engine.

Figure 2:
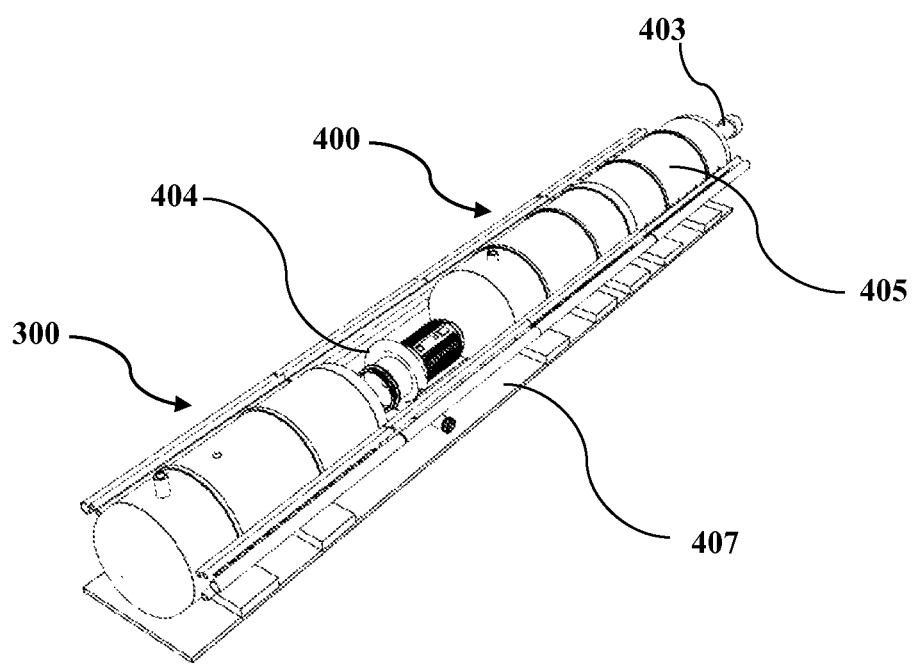
FIG. 2 is a perspective view of the exothermic reactors principally showing the basic layout of exothermic reactor alignment with a centrifugal compressor and secondary exothermic reactor including cylinder body steam inlets and main steam outlet.
Figure 3:
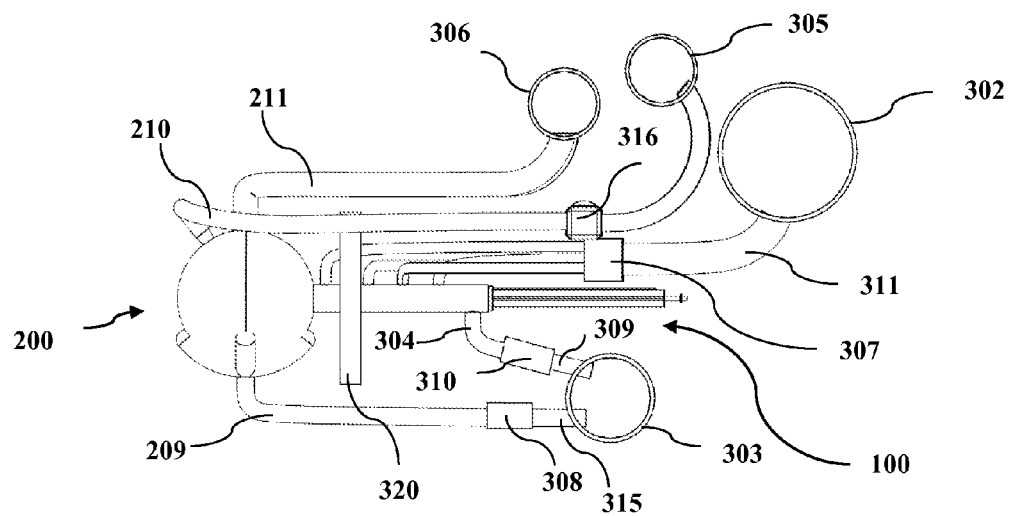
FIG. 3 is a side view of chamber core assembly principally showing main chemical supply, and discharge lines connections to the exothermic reactor.
Figure 4:
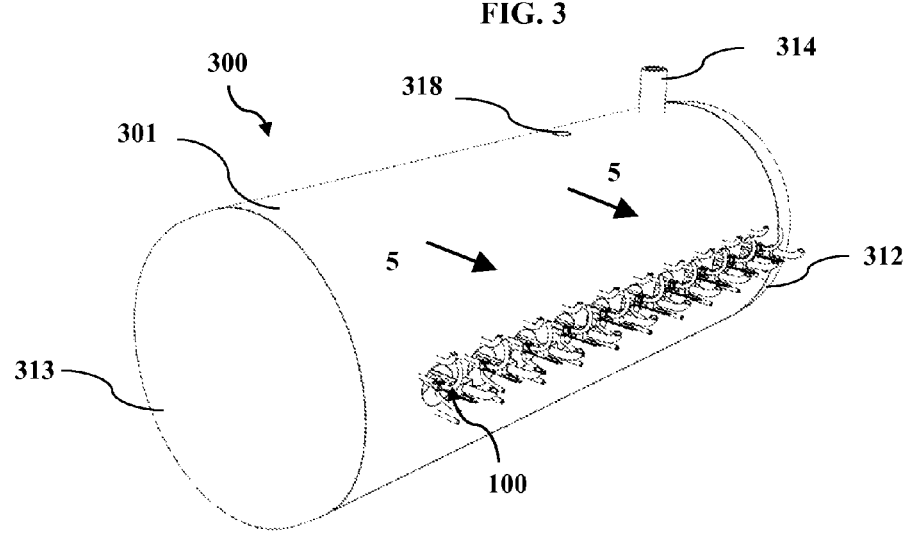
FIG. 4 is a perspective view of the exothermic reactor principally showing reaction core layout from outside.
Figure 5:
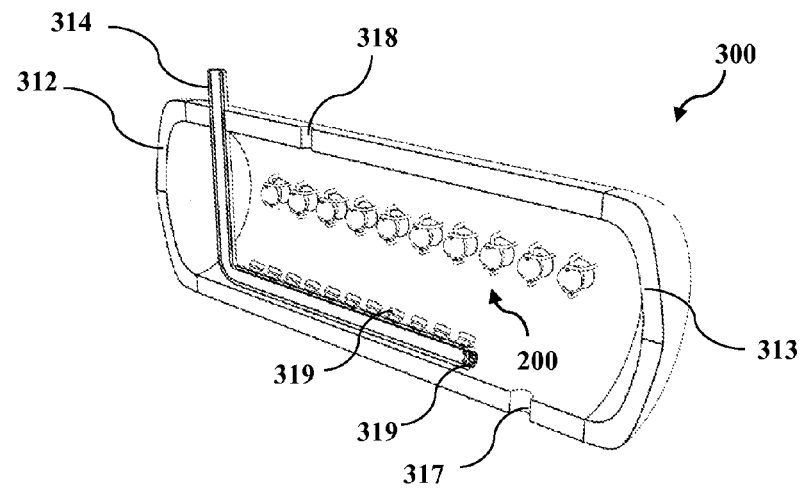
FIG. 5 is a longitudinal vertical cutting plane view of the exothermic reactor principally showing multiple numbers of reaction chamber core assemblies inside half of the cylinder body of the exothermic reactor.
Figure 6:
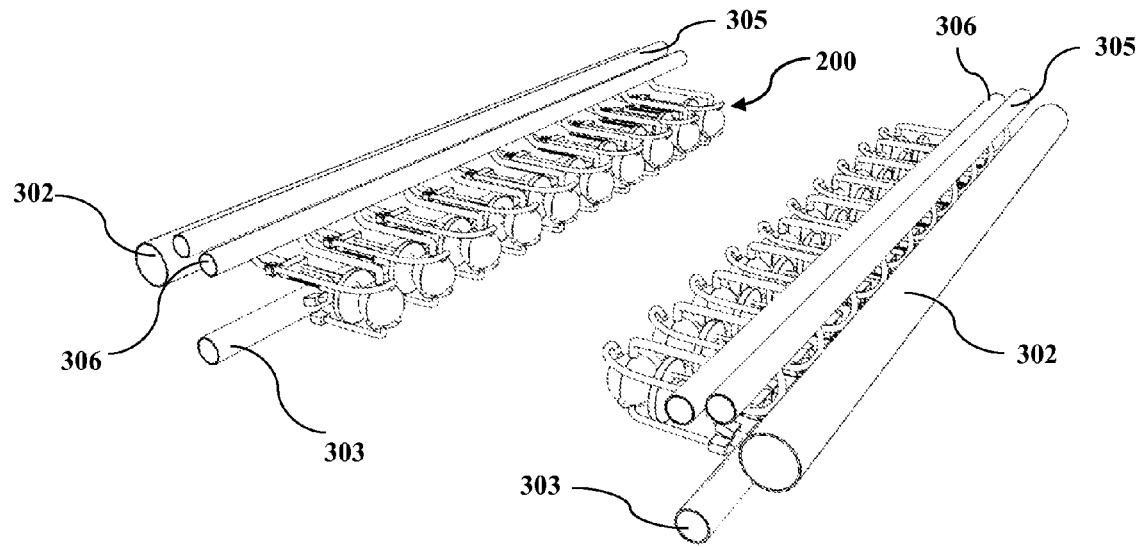
FIG. 6 is a perspective view of the exothermic reactor principally showing reaction core layout, supply and discharge lines, and connections of the pipe lines of the cores to the main supply and discharge lines. The reactor body and steam lines are extracted from the view for better understanding.
Figure 7:
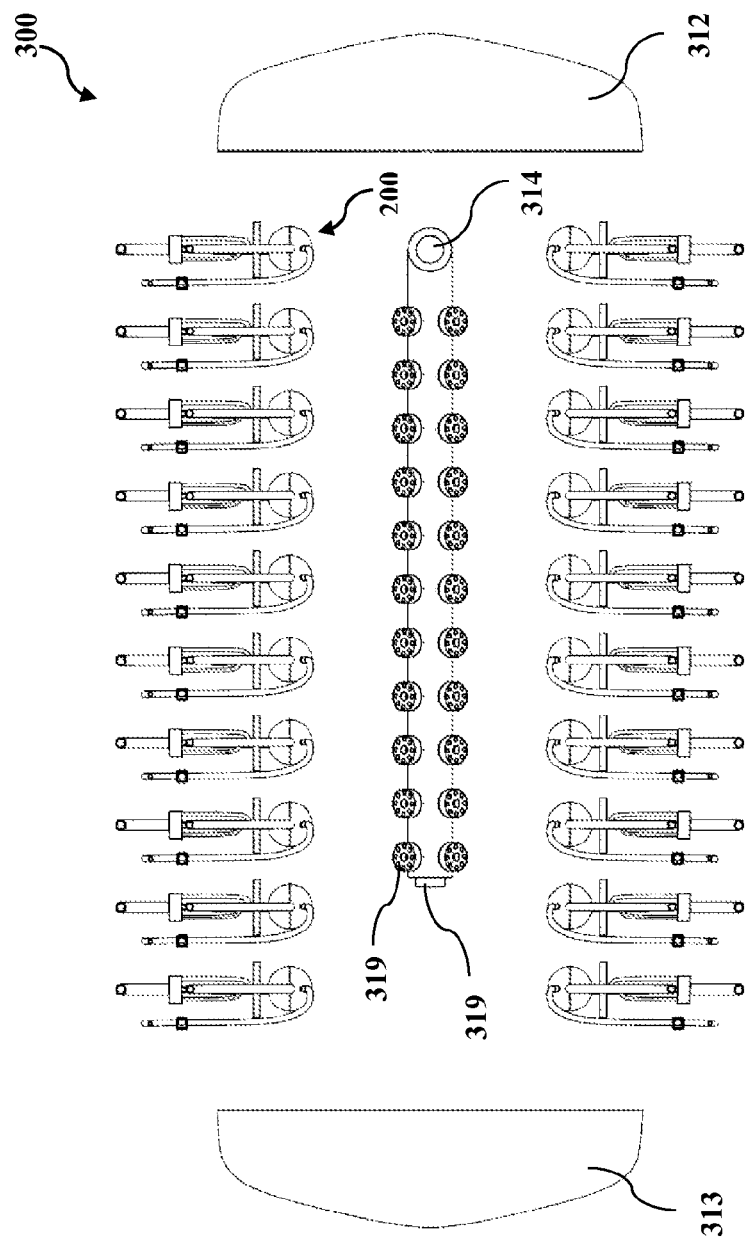
FIG. 7 is a perspective view of the exothermic reactor principally showing reaction core layout form top together with reactor cylinder body fore and aft heads, and steam return line. The cylinder part of the reactor body is extracted from the view for better understanding.

Referring FIGS. 2, and 3, the embodiments show the secondary exothermic reactor 400.

Referring FIGS. 2, 4, 5, 6, 7, and 8, the layout shows a secondary exothermic reactor 400 assembly is connected to the exothermic reactor 300 assembly. The purpose of the secondary exothermic reactor 400 is to overheat or reheating the fluid at a later stage. The secondary exothermic reactor 400 assembly is also an exemplary embodiment to the layout of an extended version of exothermic reactor 300 assembly with additional reaction chambers 200 which are 40 in number. The reaction chambers 200 inside the secondary exothermic reactor 400 are arrayed inline and symmetrical to each other at both sides of the exothermic reaction body. The reaction chambers 200, the reactant injectors 100, supply lines and all pipes in the secondary exothermic reactor 400 have identical connection design and technique with the exothermic reactor 300. The secondary exothermic reactor 400 assembly is an almost identical copy in terms of reaction chambers 200, reactant injectors 100 assemblies except the number reaction chambers.

The secondary exothermic reactor 400 assemblies or any extended or scaled version of the invention can be using different chemical reaction. The invention provides multiple types of exothermic reactor 300 assemblies using multiple types of exothermic reactions in each assembly in a whole power plant design utility. The said exothermic reactor 300 assembly may be installed on a truck platform in order to provide mobilized usage at any location.

Referring FIGS. 2, 4, 5, 6, 7, and 8, the secondary exothermic reactor 400 assembly, there is a fluid supply inlet line 406 on top of the secondary exothermic reactor body 405 which has several numbers of gas diffusers 319 on and at the end of the line inside the exothermic reactor body. These diffusers are commonly used ones in steam generators for distributing the returning steam more homogenously into the cylinder body. There is a fore head cap 401 and aft head cap 402 at the end of the cylindrical secondary exothermic reactor body 405.

The number of exothermic reactors 300 and the secondary exothermic reactors 400 may be connected to each other either parallel or serial according to the required power level and dimension of the location where the invention is needed to be installed.

Referring FIG. 2, the connection between exothermic reactor 300, and the secondary exothermic reactor 400 is shown. The centrifugal compressor 404 is enabling the transfer of the low pressure fluid to the high pressure secondary exothermic secondary reactor 400. The fluid may be steam of another type of gas to be heated and overheated depending on the steam property demand for the following turbine design connected to outlet 403. There are fluid inlets 314, 317, 406, and fluid outlets 318, and 403 on the exothermic reactor bodies 301, and 405 connected via appropriate piping systems.

Referring FIG. 2, the layout shows the invention arrangement layout mounted on a platform 407 construction.

Referring FIGS. 9-64, and FIGS. 2-8, the driving gear 116 is driven on a worm gear which gives a circular movement to the blade inside the reactant injector 100. The blade shaft 103 and blades 104 enable the homogenous mixture of the injected chemicals inside the agent injector body 101 and prevents any clogging inside the agent injector body 101. As the piston 102 and pusher head 106 start to move the chemical reactant or reactants start to be pumped inside the injector body 101 from the chemical agent supply lines 302 passing through the injection ports 105, and 112. The chemical agent or a mixture is pushed out to the reaction chamber body 201. Meanwhile the fore end side of the blade shaft 103 hits the backpressure valve 108. The backpressure valve 108 starts to move to the same direction with the blade shaft 103 on its back pressure shaft 109 and at the same time the back pressure spring 110 starts to shrink. The backpressure valve 108 is being opened towards the inside direction of the reaction chamber body 201 with the force of blade shaft 103. Close to the ending time of the chemical agent injection process, the exothermic reaction starting agent(s) or chemical(s) is/are started to be pulverized to inside of the reaction chamber body 201 from the secondary reactant supply line 305 by passing through the supply pipe line 210 and then passing from upper angled top side port 202. Meanwhile the chemical reaction starts inside the reaction chamber body 201. As the reaction continue, in a very short time frame the blade shaft 103 moves backwards to its original starting position. As the blade shaft 103 moves backwards, the back pressure valve 108 is closed with the relief of the back pressure spring 110 on back pressure shaft 109. The closing of the backpressure valve prevents the ingression of the chemical reaction products inside the reactant agent injector body 101. The nozzle portion 111 diverts the injected chemical reactants to move towards the collector drain 205 direction of the reaction chamber body 201. When the exothermic reaction ends inside the reaction chamber the reaction products at the collector drain 205 of the chamber are vacuumed or transferred outside the reaction chamber body 201 by passing through drain port 204, and drain pipe 209, and drain check-valve 308 and drain pipe line 303 to any collector or collector tank system. As the exothermic reaction occurs the heat produced by the chemical reaction is transferred to the fluid inside the exothermic reactor body 301 and same happens inside the secondary exothermic reactor body 401. The heat transfer from the reaction occurs mainly conductive type and then convective and radiation type. The reaction chamber body 201 material can either be known high conductive materials or preferably nanotechnology ceramic material. When the exothermic reaction ends inside the reaction chamber body 201 the gas as the result of the reaction production is vacuumed or transferred from the reaction chamber body 201 by passing through the upper vertical port 203, and drain pipe 211, and suction transfer line 306 to the collector or collector tank system or exhaust system.

The parts mentioned above which are standard and well known and not mentioned detail are listed as following: Solenoid valves, check-valves, bi-directional valves, tri-directional valves, proportional valves, venturi valves, piping systems, centrifugal compressor, alternator, electronic servo controller, pneumatic controller, hydraulic controller, turbine system (steam or gas turbine), and other unmentioned general industrial components which may be needed.

The abbreviations which are used in this application have the following definitions:

CODAG: Combined Diesel and Gas Turbine system

COGEN: A process in which an industrial facility uses its waste energy to produce heat or electricity.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to those preferred aspects of the invention.

What is claimed is:

1. An air independent power generation system, and air independent propulsion system based on a thermal cycle wherein the thermal energy is generated from an exothermic reaction cycle in a controlled volume space;

Wherein the controlled volume space is a reaction chamber assembly comprising reaction chamber assemblies, chemical reactant injector assemblies, chemical reactant supply lines, reaction products discharge lines, electro-mechanic and computerized reaction and thermal cycle control systems;

Wherein the exothermic reaction cycle is a continuous process and generated inside a reaction chamber assembly comprising a reaction chamber connected to a chemical reactant injector and discharge ports; and the reaction chamber is installed inside a vessel containing a medium to be heated for the thermal cycle process;

Wherein the invention comprises low pressure and high pressure vessels for heating and cooling a fluid in a continuous thermal cycle supplying a power turbine which is then connected to a mechanical or magnetic power transfer mechanism either for electric generation or for propulsion or both;

Wherein the low pressure and high pressure heating vessels of the thermal cycle comprise at least one chemical reactant injector connected to at least one chemical reaction chamber and said units are connected to a chemical reactant supply and discharge lines for transferring the reaction products during an exothermic chemical reaction cycle;

Wherein the chemical reaction chambers, chemical reactant supply lines, discharge lines are completely separated from the thermal cycle and only interaction between chemical reaction and the thermal cycle is the heat transfer (conductive, radiation, convective) process through the reaction chamber walls towards the inside of the heating vessel for heating the heat transfer fluid of the thermal cycle process.

2. In accordance to claim 1, a thermal cycle connected to an electric alternator, battery unit, propulsion system comprising of mechanical gearbox(es), clutches, propellers, jet pumps or electromagnetic hydrodynamic (MHD) thruster.

3. In accordance to claim 1, wherein the invention claimed is connected to a plasma thruster either for propulsion or electric generation or both.

4. In accordance to claim 1, a power generation system for supplying power, heat, propulsion or energy to sub-sea and surface vessels and marine constructions, aerospace and space vehicles and orbital constructions, industrial facilities, and residential areas.

5. In accordance to claim 1; a method for generating thermal energy cycle independent from air and is only based on an exothermic reaction wherein the multiple exothermic reactions are occurred in a controlled volume space by adjusting reaction speed, chemical reactant flow and thermal heat output flow.

6. In accordance to claim 1, a method for generating thermal energy from an exothermic reaction cycle based on using single or multiple type(s) of chemicals to be mixed in adjustable ratios by mass or by volume before transferring them into the reaction chamber for exothermic reaction in a controlled volume space;

Wherein the thermal energy is the result of a chemical reaction of exothermically reactant chemicals in a reaction chamber assembly;

Wherein multiple reactants which are neutral, inert or non-reactive to each other when mixed in a separate controlled volume;

Wherein the mixed reactants are sent to a set of reaction chambers for reacting with the reactive chemical(s) injected into the reaction chamber;

Wherein the exothermic reaction products are still reactive and have potential to generate a subsequent exothermic reaction after the first reaction with the main reactive chemical that is used to start the initial exothermic reaction;

Wherein the set of reaction chambers are located inside a medium and the thermal energy is transferred to a medium through the walls of the reaction chamber or reaction core.

7. In accordance with claim 1, an exothermic reactor system which is installed as a power plant or a propulsion system, part of a power plant or a propulsion system in combination with internal combustion engines, in combination with power turbines (steam, gas), or plasma thrusters.

8. In accordance to claim 1, an exothermic reactor assembly comprising set of reaction chambers, chemical reactant injectors, high and low pressure heating vessels;

a. Wherein a reaction chamber assembly having an improved use in exothermic reactor and assemblies comprising a set of reaction chambers having inlet and discharge ports and connected to a chemical reactant injector assembly;
 b. Wherein the reactant injector assembly having reactant inlet ports, a body portion mixing multiple chemicals before the exothermic reaction timing, a discharge port for transferring the remaining chemicals inside the injector after the injection or for back flushing or cleaning the injector, a revolving shaft with blades for creating a vortex for homogenous mixture of the chemical reactants, a pusher head for accelerating the reactants inside the body potion towards the reaction chamber direction, a back pressure valve for preventing the ingress of the exothermic reaction products from the reaction chamber after the injection stage, and a nozzle portion for diverting the reactants to the target reaction location inside the reaction chamber;
 c. Wherein different chemical reactants are used either dependently, or independently to each other;
 d. Wherein the reaction chambers are connected to each other either serial, inline, parallel, or independently as a set;
 e. Wherein the reaction chambers are installed inside the high pressure and/or low pressure vessels for heating the fluid inside the vessels.

9. As described in claim 1, a thermal energy transfer unit configuration which is used alone as a single unit for transferring thermal energy to any medium in any phase of the matter comprises a reaction chamber assembly, a chemical reactant injector assembly.

10. In accordance to claim 1, a plasma thruster system wherein the products of the exothermic reaction cycle is converted or transformed into a plasma fuel by an ionization process.

11. In accordance to claim 1, a modular and mobile exothermic reactor assembly for connecting to a combustion engine exhaust line or to a return line of a steam or gas cycle for reheating and generating an additional thermal cycle system.

* * * * *